US009182551B2

(12) United States Patent  
Oyagi et al.

(10) Patent No.: US 9,182,551 B2  
(45) Date of Patent: Nov. 10, 2015

(54) LENS COMPONENT AND OPTICAL MODULE PROVIDED WITH THE SAME

(71) Applicant: SUMITOMO ELECTRIC INDUSTRIES, LTD., Osaka-shi, Osaka (JP)

(72) Inventors: Masaki Oyagi, Yokohama (JP); Takayuki Shimazu, Yokohama (JP); Michiko Harumoto, Yokohama (JP); Mitsutaka Satou, Yokohama (JP); Ayaka Mori, Yokohama (JP); Hajime Arao, Yokohama (JP); Atsushi Suzuki, Yokohama (JP); Motoyoshi Kimura, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/379,635

(22) PCT Filed: Jan. 22, 2013

(86) PCT No.: PCT/JP2013/051219  
§ 371 (c)(1),  
(2) Date: Aug. 19, 2014

(87) PCT Pub. No.: WO2013/125283  
PCT Pub. Date: Aug. 29, 2013

(65) Prior Publication Data  
US 2015/0010273 A1  Jan. 8, 2015

(30) Foreign Application Priority Data

Feb. 20, 2012 (JP) .................................. 2012-033861  
Oct. 23, 2012 (JP) .................................. 2012-233538

(51) Int. Cl.  
*G02B 6/32* (2006.01)  
*G02B 6/42* (2006.01)  
*G02B 6/38* (2006.01)

(52) U.S. Cl.  
CPC ........ *G02B 6/32* (2013.01); *G02B 6/428* (2013.01); *G02B 6/4214* (2013.01); *G02B 6/4284* (2013.01); *G02B 6/3887* (2013.01)

(58) Field of Classification Search  
CPC ....................................................... G02B 6/32  
See application file for complete search history.

(56) References Cited

U.S. PATENT DOCUMENTS 6,160,937 A * 12/2000 Fukuyama et al. ............. 385/52  
6,432,733 B1   8/2002 Hashizume  
(Continued)

FOREIGN PATENT DOCUMENTS

| JP | S61-278806 A | 12/1986 |
| JP | S64-020750 U | 2/1989 |
| JP | H07-218773 A | 8/1995 |
| JP | 2004-096091 A | 3/2004 |
| JP | 2004-239997 A | 8/2004 |

(Continued)

*Primary Examiner* — Omar R Rojas  
(74) *Attorney, Agent, or Firm* — Drinker Biddle & Reath LLP

(57) ABSTRACT

A lens component has a element-side lens portion 65 which is provided so as to face a light emitting and receiving element 52 mounted on a circuit substrate 24, a positioning portion 75 that protrudes such that the element-side lens portion 65 is separated from the circuit substrate 24 by a predetermined distance, and an adhesion portion 76 that forms an adhesive-agent filling space S, which is filled with an adhesive agent 77, between the circuit substrate 24 and the adhesion portion 26, in a state where the positioning portion 75 contacts with the circuit substrate 24 and the element-side lens portion 65 is fixed so as to face the light emitting and receiving element 52.

13 Claims, 13 Drawing Sheets

(56) References Cited

U.S. PATENT DOCUMENTS

| | | |
|---|---|---|
| 7,612,881 B2 | 11/2009 | Ban et al. |
| 7,850,373 B2 * | 12/2010 | Ishigami et al. ............... 385/92 |
| 2004/0184743 A1 | 9/2004 | Morioka |
| 2006/0104577 A1 | 5/2006 | Morioka |
| 2006/0110110 A1 * | 5/2006 | Yi et al. ......................... 385/93 |
| 2006/0164738 A1 | 7/2006 | Yamamoto et al. |
| 2007/0183709 A1 | 8/2007 | Furuno et al. |
| 2009/0154877 A1 | 6/2009 | Morioka |

FOREIGN PATENT DOCUMENTS

| | | |
|---|---|---|
| JP | 2005-031556 A | 2/2005 |
| JP | 2005-037450 A | 2/2005 |
| JP | 2007-079175 A | 3/2007 |
| JP | 2007-218773 | 8/2007 |
| JP | 2007-241200 A | 9/2007 |
| JP | 2009-163212 A | 7/2009 |
| TW | 394857 | 6/2000 |
| WO | WO 2011/089499 A | 7/2011 |

* cited by examiner

LENS COMPONENT AND OPTICAL MODULE PROVIDED WITH THE SAME

TECHNICAL FIELD

The present invention relates to a lens component used in an optical module or the like, and the optical module provided with the same.

BACKGROUND ART

An optical module is known that converts an electrical signal into an optical signal, or an optical signal into an electrical signal. Such an optical module includes an optical fiber, a photoelectric conversion element, and a lens component that guides light from the optical fiber to the photoelectric conversion element. The lens component is adhesively fixed to a substrate, on which the photoelectric conversion element is mounted, using an adhesive agent after positioning a lens portion with respect to the photoelectric conversion element (for example, refer to PTL 1).

CITATION LIST

Patent Literature

[PTL 1] JP-A-2009-163212

SUMMARY OF INVENTION

Technical Problem

Such a lens component requires positioning precision between the lens component and the photoelectric conversion element or the optical fiber. When the positioning between both parties is not accurate, the optical coupling efficiency varies.

For this reason, the positions in the optical module disclosed in PTL 1 are determined by fitting a positioning recess or a positioning protrusion provided in the lens component, and a positioning protrusion or a positioning recess provided in the photoelectric conversion element. According to this method, it is possible to enhance the positioning precision within a surface orthogonal to an optical axis of the photoelectric conversion element.

However, when the lens component is fixed to a substrate using an adhesive agent, in some cases, the thickness of the adhesive agent varies due to the adhesive agent interposed between the lens component and the substrate. Accordingly, there is a concern that the distance between the lens component and the photoelectric conversion element in an optical axis direction may vary, and therefore, that the optical coupling efficiency may vary. In addition, there is a concern that the thickness of the adhesive agent may vary due to the adhesive agent being expanded and contracted by changes in environmental temperature, and therefore, similarly, that the optical coupling efficiency may vary.

A lens component of the invention which can solve the problem is a lens component for optically connecting an optical element and an optical fiber, comprising:
  an element-side lens portion which is provided so as to face the optical element mounted on a substrate;
  a fiber-side lens portion which is provided so as to face the optical fiber;
  a reflecting surface optically connected to the fiber-side lens portion and the element-side lens portion which have different optical axes to each other;
  a positioning portion that protrudes such that the element-side lens portion is separated from the substrate by a predetermined distance; and
  an adhesion portion that forms an adhesive-agent filling space, which is filled with an adhesive agent, between the substrate and the adhesion portion, in a state where the positioning portion contacts with the substrate and the element-side lens portion is fixed so as to face the optical element.

The lens component of the invention may further comprise:
  an accommodation space that accommodates the optical element and a control circuit that drives the optical element,
  wherein the positioning portion is provided in the periphery of the accommodation space so as to surround the accommodation space.

In the lens component of the invention, the positioning portion may protrude more than the adhesion portion.

In the lens component of the invention, the adhesive-agent filling space may be formed so as to extend along a protruding direction of the positioning portion.

In the lens component of the invention, the adhesive-agent filling space may be formed so as to be recessed from a side surface of the lens component and is formed so as to spread from the lens portion to the substrate.

An optical module of the invention comprises:
  an optical fiber;
  an optical element;
  a substrate on which the optical element is mounted; and
  a lens component that optically connects the optical fiber and the optical element,
  wherein the lens component includes
  a lens portion that faces the optical element;
  a positioning portion that protrudes more than the lens portion such that the lens portion is separated from the substrate by a predetermined distance, and contacts with the substrate; and
  an adhesion portion which is provided adjacent to the positioning portion and forms an adhesive-agent filling space between the substrate and the adhesion portion,
  wherein the lens component is fixed to the substrate using an adhesive agent introduced to the adhesive-agent filling space in a state where the positioning portion contacts with the substrate.

In the optical module of the invention, a first metal pad and a second metal pad, which are formed to have an equal thickness through the same process, may be provided on the substrate, the optical element may be mounted on the first metal pad, and the positioning portion may contact with the second metal pad.

In the optical module of the invention, an electrical wiring, which is connected to a control circuit that controls the optical element, may extend in one direction from the optical element, and the second metal pads may be provided at positions facing each other with the electrical wiring interposed therebetween.

In the optical module of the invention, the second metal pad may be provided so as to surround the first metal pad.

In the optical module of the invention, the positioning portion may protrude more than the adhesion portion.

In the optical module of the invention, in the lens component, the lens portion may include a first lens portion facing the optical fiber which is a transmission-side optical fiber, and a second lens portion facing the optical element which is a light emitting element,
  the optical module may further comprise a transmission-side optical system including the transmission-side optical fiber, the light emitting element, the first lens portion, and the second lens portion, the following inequations (1) to (3) may be established when the following variables are set such that the numerical aperture of the first lens portion is NA1, the numerical aperture of the second lens portion is NA2, the magnification of the second lens portion is M, the radius of light emitting surface of the light emitting element is $\Phi 1$, the maximum error of the mounting position of the light emitting element is d1, the core diameter of the optical fiber is $\Phi 2$, and the maximum error of the mounting position of the optical fiber is d2, a tip end of the optical fiber may be positioned at a position which is offset from a focal position of the lens portion in an optical axis direction such that the reflection return light intensity decreases by 10 dB or greater compared to a case where the optical coupling efficiency of the light emitting element and the optical fiber is maximum, and that decrease of the optical coupling efficiency with respect to the case where the optical coupling efficiency of the light emitting element and the optical fiber is maximum decreases is 1 dB or less.

$$M\Phi 1 < \Phi 2 \quad (1)$$

$$M(d1+\Phi 1/2) < \Phi 2/2 - d2 \quad (2)$$

$$NA1/M \leq NA2 \quad (3)$$

In the optical module of the invention, the lens portion may include a third lens portion facing the optical fiber which is a reception-side optical fiber, and a fourth lens portion facing the optical element which is a light receiving element, the optical module may further comprise a reception-side optical system including the reception-side optical fiber, the light receiving element, the third lens portion, and the fourth lens portion, decrease of the total optical coupling efficiency in the transmission-side optical system and the reception-side optical system with respect to the maximum efficiency decreases may be 3 dB to 6 dB.

In the optical module of the invention, the third lens portion may be disposed such that the reception-side optical fiber is positioned at a focal position thereof, the fourth lens portion may be disposed such that the light receiving element is positioned at a focal position thereof, and at least one of the third lens portion and the fourth lens portion may be an aspherical lens.

In the optical module of the invention, the adhesive-agent filling space may extend along a protruding direction of the positioning portion.

In the optical module of the invention, the adhesive-agent filling space may be formed so as to be recessed from a side surface of the lens component and may be formed so as to spread from the lens portion to the substrate.

In the optical module of the invention, a recess may be provided in a region facing the adhesive portion of the substrate, and the adhesive agent may be filled in the adhesive-agent filling space and the recess.

In the optical module of the invention, the adhesive agent may be filled such that the thickness of the adhesive agent along a surface direction of the substrate becomes largest between a side of the adhesion portion closest to the substrate and the substrate.

In the optical module of the invention, the adhesive agent may be applied by extending over a side surface of the substrate from the adhesive-agent filling space.

The optical module of the invention, may further comprise:

an accommodation member that accommodates the lens component and the substrate, wherein a portion of the adhesive agent is removed in a direction along the side surface of the substrate and a side surface of the accommodation member is provided along the removed surface of the adhesive agent.

Effect of Invention

SUMMARY OF EMBODIMENTS OF THE INVENTION

Figure 1:
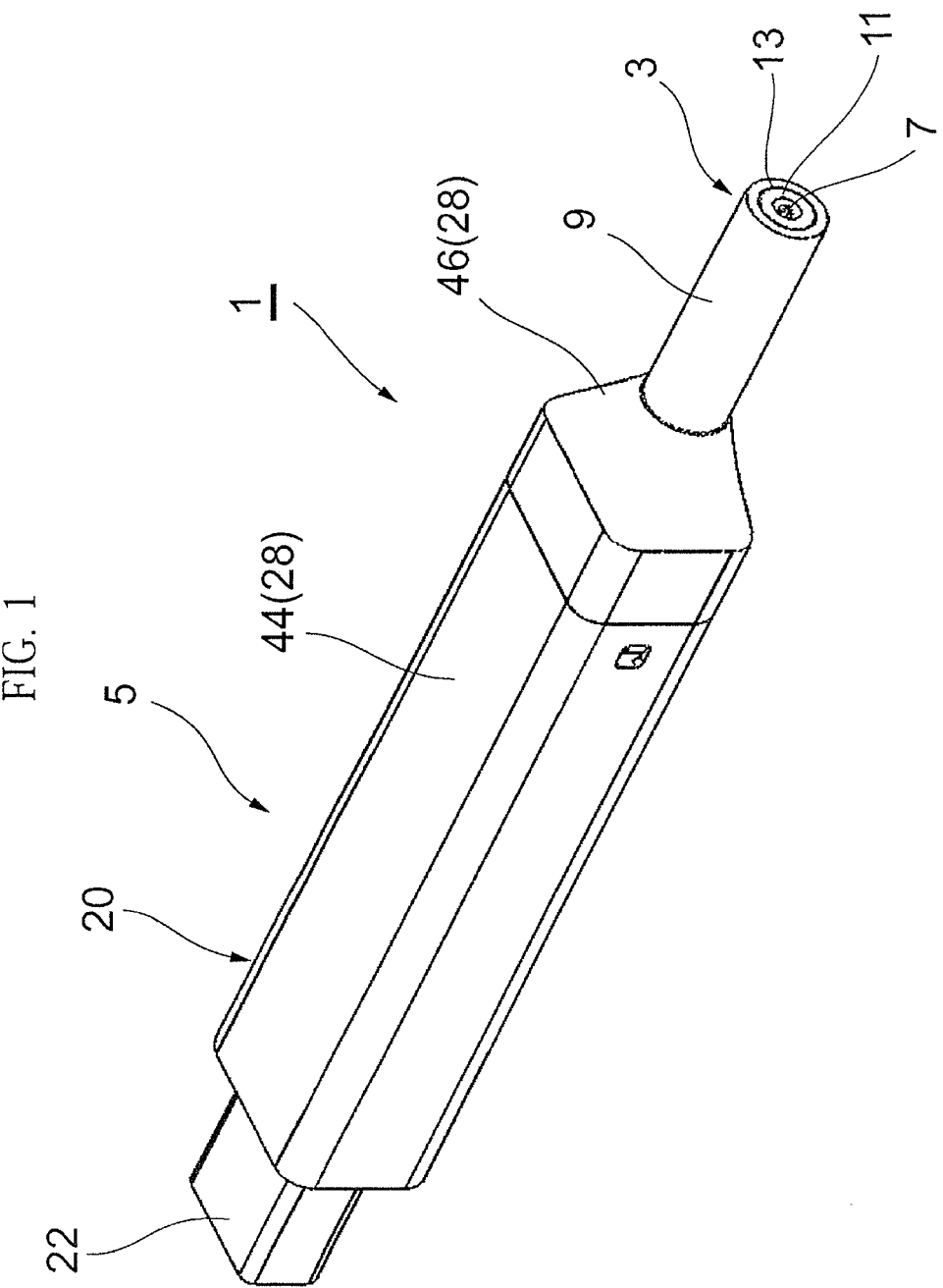
FIG. 1 is a perspective view showing an optical module according to the present embodiment.

First, a summary of an embodiment of the invention will be described.

A lens component for optically connecting an optical element and an optical fiber, comprising:

an element-side lens portion which is provided so as to face the optical element mounted on a substrate;

a fiber-side lens portion which is provided so as to face the optical fiber;

a reflecting surface optically connected to the fiber-side lens portion and the element-side lens portion which have different optical axes to each other;

a positioning portion that protrudes such that the element-side lens portion is separated from the substrate by a predetermined distance; and an adhesion portion that forms an adhesive-agent filling space, which is filled with an adhesive agent, between the substrate and the adhesion portion, in a state where the positioning portion contacts with the substrate and the element-side lens portion is fixed so as to face the optical element.

The lens component may further comprise:

an accommodation space that accommodates the optical element and a control circuit that drives the optical element, wherein the positioning portions are provided at positions facing each other with the accommodation space interposed therebetween.

The lens component may further comprise:

an accommodation space that accommodates the optical element and a control circuit that drives the optical element, wherein the positioning portion is provided in the periphery of the accommodation space so as to surround the accommodation space.

In the lens component, the positioning portion may protrude more than the adhesion portion.

In the lens component, the adhesive-agent filling space may be formed so as to extend along a protruding direction of the positioning portion.

In the lens component, the adhesive-agent filling space may be formed so as to be recessed from a side surface of the lens component and is formed so as to spread from the element-side lens portion to the substrate.

An optical module of the invention comprises:

an optical fiber;
an optical element;
a substrate on which the optical element is mounted; and
a lens component that optically connects the optical fiber and the optical element,
wherein the lens component includes
a lens portion that faces the optical element;
a reflecting surface optically connected to the lens portion and the optical fiber;
a positioning portion that protrudes more than the lens portion such that the lens portion is separated from the substrate by a predetermined distance, and contacts with the substrate; and
an adhesion portion which is provided adjacent to the positioning portion and forms an adhesive-agent filling space between the substrate and the adhesion portion,
wherein the lens component is fixed to the substrate using an adhesive agent introduced to the adhesive-agent filling space in a state where the positioning portion contacts with the substrate.

In the optical module, a first metal pad and a second metal pad, which are formed to have an equal thickness, may be provided on the substrate, the optical element may be mounted on the first metal pad, and the positioning portion may contact with the second metal pad.

In the optical module, an electrical wiring, which is connected to a control circuit that controls the optical element, may extend in one direction from the optical element, and the second metal pads may be provided at positions facing each other with the electrical wiring interposed therebetween.

In the optical module, the second metal pad may be provided so as to surround the first metal pad.

In the optical module, the positioning portion may protrude more than the adhesion portion.

In the optical module, the lens portion may include a first lens portion facing the optical fiber which is a transmission-side optical fiber, a second lens portion facing the optical element which is a light emitting element, and the first lens portion and the second lens portion may be optically connected by the reflecting surface, the optical module may further comprise a transmission-side optical system including the transmission-side optical fiber, the light emitting element, the first lens portion, and the second lens portion, the following inequations (1) to (3) may be established when the following variables are set such that the numerical aperture of the light emitting element is NM, the numerical aperture of the transmission-side optical fiber is NA2, the magnification of the transmission-side optical system is M, the diameter of light emitting surface of the light emitting element is F1, the maximum error of the mounting position of the light emitting element is d1, the core diameter of the optical fiber is F2, and the maximum error of the mounting position of the optical fiber is d2, and a tip end of the optical fiber may be positioned at a position which is offset from a focal position of the lens portion in an optical axis direction such that the reflection return light intensity decreases by 10 dB or greater compared to a case where the optical coupling efficiency of the light emitting element and the optical fiber is maximum, and that decrease of the optical coupling efficiency with respect to the case where the optical coupling efficiency of the light emitting element and the optical fiber is maximum decreases is 1 dB or less.

$$M\Phi 1 < \Phi 2 \tag{1}$$

$$M(d1+\Phi 1/2) < \Phi 2/2 - d2 \tag{2}$$

$$NA1/M < NA2 \tag{3}$$

In the optical module, the lens portion may include a third lens portion facing the optical fiber which is a reception-side optical fiber, and a fourth lens portion facing the optical element which is a light receiving element, the optical module may further comprise
a reception-side optical system including the reception-side optical fiber, the light receiving element, the third lens portion, and the fourth lens portion,
decrease of the total optical coupling efficiency in the transmission-side optical system and the reception-side optical system with respect to the maximum efficiency decreases may be 3 dB to 6 dB.

In the optical module, the third lens portion may be disposed such that the reception-side optical fiber is positioned at a focal position thereof, the fourth lens portion may be disposed such that the light receiving element is positioned at a focal position thereof, and at least one of the third lens portion and the fourth lens portion may be an aspherical lens.

In the optical module, the adhesive-agent filling space may extend along a protruding direction of the positioning portion.

In the optical module, the adhesive-agent filling space may be formed so as to be recessed from a side surface of the lens component and may be formed so as to spread from the lens portion to the substrate.

In the optical module of the invention, a recess may be provided in a region facing the adhesive portion of the substrate, and the adhesive agent may be filled in the adhesive-agent filling space and the recess.

In the optical module, the adhesive agent may be filled such that the thickness of the adhesive agent along a surface direction of the substrate becomes largest between a side of the adhesion portion closest to the substrate and the substrate.

In the optical module, the adhesive agent may be applied by extending over a side surface of the substrate from the adhesive-agent filling space.

The optical module, may further comprise:
an accommodation member that accommodates the lens component and the substrate,
wherein a portion of the adhesive agent is removed in a direction along the side surface of the substrate and a side surface of the accommodation member is provided along the removed surface of the adhesive agent.

According to the invention, it is possible to provide a lens component which can obtain high optical coupling efficiency, and an optical module which can obtain the high optical coupling efficiency by being provided with the same.

Details of Embodiment of the Invention

Figure 2:
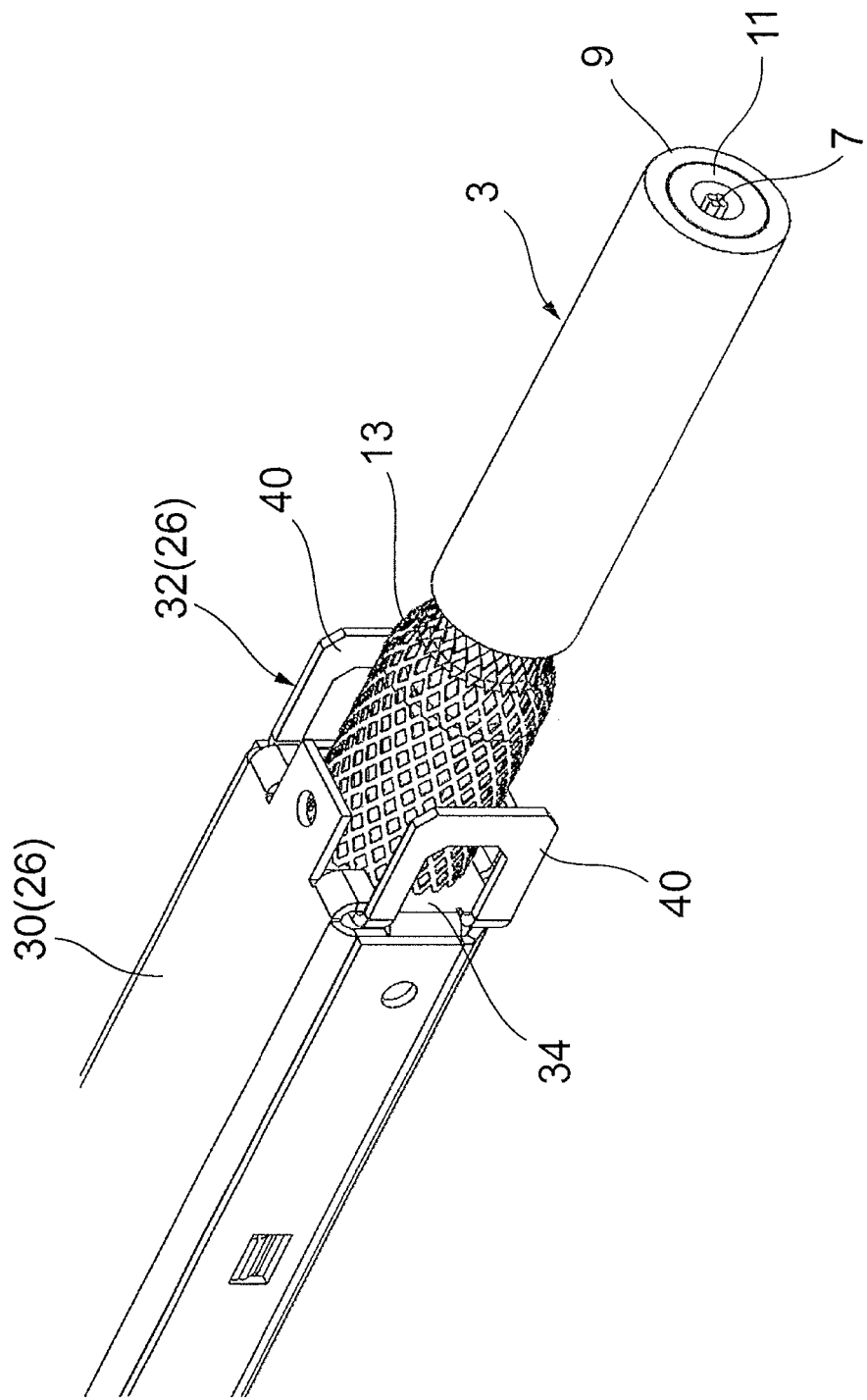
FIG. 2 is a perspective view showing a state in which a resin housing is removed.
Figure 3:
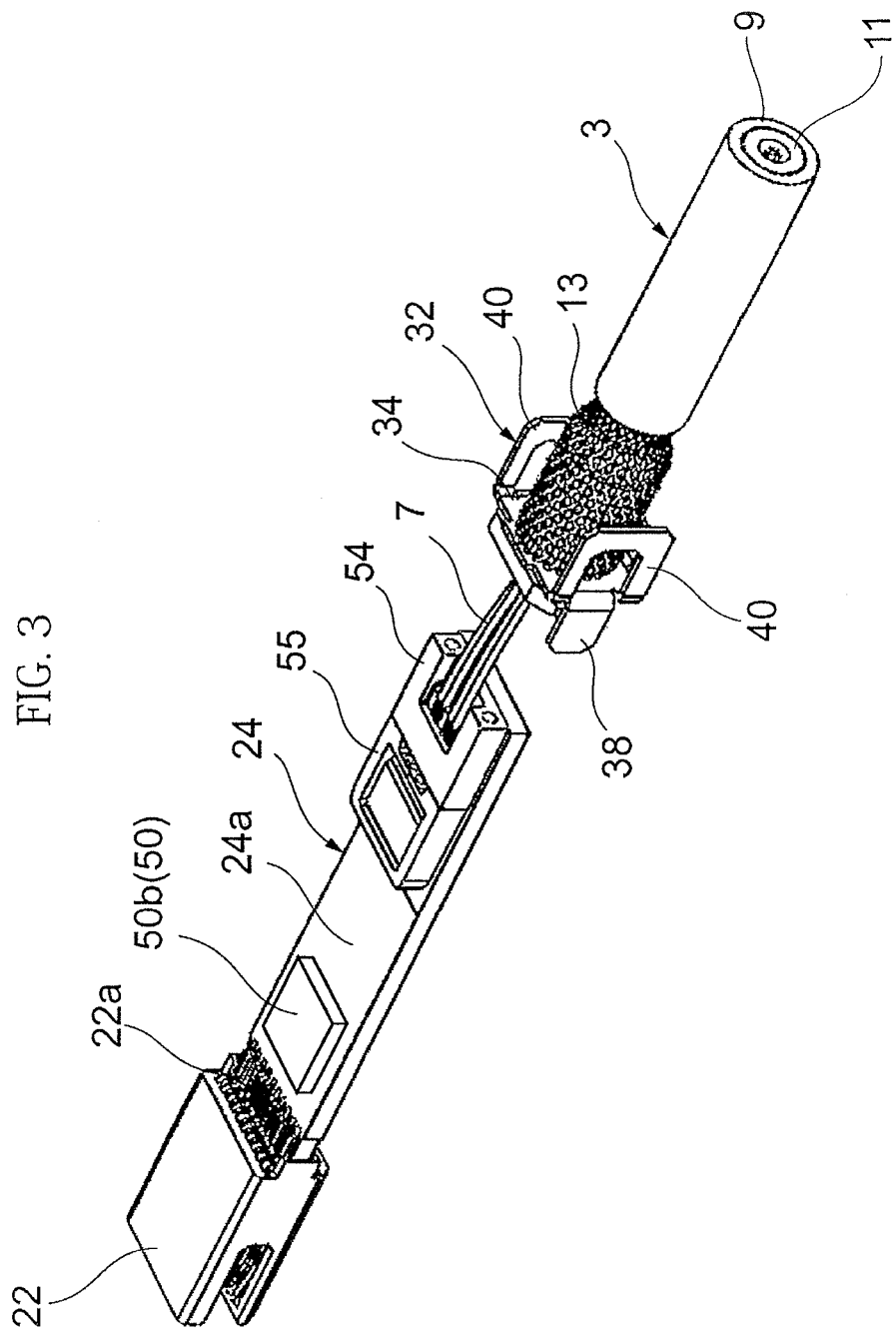
FIG. 3 is a perspective view showing a state in which a housing is removed.

As shown in FIGS. 1 to 3, an optical module 1 is attached to an end portion of an optical cable 3. The optical cable 3 is a single-core optical cable or a multi-core optical cable.

The optical cable 3 has a plurality (4 fibers in this example) of optical fibers (optical elements) 7; a resin jacket 9 which coats the optical fibers 7; a tension fiber (Kevlar) 11 which is interposed between the optical fibers 7 and the jacket 9 and has an ultrafine diameter; and a metal braid 13 interposed between the jacket 9 and the tension fiber 11. That is, in the optical cable 3, the optical fibers 7, the tension fiber 11, the metal braid 13, and the jacket 9 are disposed in this order from the center toward the outside in a radial direction.

The optical fibers 7 may be realized by, for example, optical fibers that use quartz glass for the core and the cladding (AGF: All Glass Fiber), or plastic optical fibers that use hard plastic for the cladding (HPCF: Hard Plastic Cladding Fiber). When ultrafine HPCF in which the core diameter of the glass is 80 μm is used, it is difficult to break even if the optical fibers 7 are bent in a small diameter.

The jacket 9 is formed of non-halogenated flame retardant resin, for example, PVC (polyvinyl chloride). The outer diameter of the jacket 9 is about 4.2 mm. The tension fiber 11 is, for example, an aramid fiber and built into the optical cable 3 in a state of being gathered in bundles.

The metal braid 13 is, for example, formed of a tinned electrically-conductive wire, the braid density thereof is greater than or equal to 70%, and the braided angle thereof is 45° to 60°. The outer diameter of the metal braid 13 is about 0.05 mm.

The optical module 1 is provided with a housing 20, an electrical connector 22 provided on a front end (tip end) side of the housing 20, and a circuit substrate 24 accommodated in the housing 20.

The housing 20 has a metal housing 26 and a resin housing 28. The metal housing 26 has an accommodation member 30 and a fixation member 32 which is connected to a rear end portion of the accommodation member 30 and which fixes the optical cable 3.

The accommodation member 30 is a cylindrical hollow member having an approximately rectangular cross section. The accommodation member 30 is provided with an accommodation space in which the circuit substrate 24 or the like is accommodated. The electrical connector 22 is provided at a front end side of the accommodation member 30. The fixation member 32 is connected to the rear end side of the accommodation member 30.

The fixation member 32 has a plate-like base portion 34; a cylindrical part (not shown) that protrudes to the optical cable 3 side; a pair of first overhang pieces 38 that overhangs forward from both sides of the base portion 34; and a pair of second overhang pieces 40 that overhangs backward from both sides of the base portion 34. Each of the pair of first overhang pieces 38 is inserted from the rear portion of the accommodation member 30 and is connected to the accommodation member 30 by contacting with the accommodation member 30. The pair of second overhang pieces 40 is connected to a boot 46 of the resin housing 28 to be described later. In the fixation member 32, the base portion 34, the cylindrical part, the first overhang pieces 38, and the second overhang pieces 40 are formed integrally using sheet metal.

The cylindrical part has an approximately cylindrical shape and protrudes backward from the base portion 34. The cylindrical part holds the optical cable 3 by cooperation with a caulking ring (not shown). Specifically, after peeling away the jacket 9, the optical fibers 7 of the optical cable 3 are inserted to the inside of the cylindrical part and the tension fiber 11 is disposed along the outer circumferential surface of the cylindrical part. Then, the caulking ring is disposed on the tension fiber 11 which is disposed on the outer circumferential surface of the cylindrical part to caulk the caulking ring. Accordingly, the tension fiber 11 is interposed between the cylindrical part and the caulking ring and fixed, and the optical cable 3 is held and fixed to the fixation member 32.

An end portion of the metal braid 13 of the optical cable 3 is jointed to the base portion 34 by solder. Specifically, the metal braid 13 is disposed so as to cover the outer circumference of the caulking ring (cylindrical part) in the fixation member 32. The end portion of the metal braid 13 is extended to a surface (rear surface) of the base portion 34 and jointed by solder. Accordingly, the fixation member 32 and the metal braid 13 are thermally connected to each other. Furthermore, the accommodation member 30 and the fixation member 32 are physically and thermally connected to each other by the fixation member 32 being coupled to the rear end portion of the accommodation member 30. That is, the accommodation member 30 and the metal braid 13 of the optical cable 3 are thermally connected to each other.

The resin housing 28 is formed of, for example, a resin material such as polycarbonate and covers the metal housing 26. The resin housing 28 has an exterior housing 44 and the boot 46 which is connected to the exterior housing 44. The exterior housing 44 is provided so as to cover an outer surface of the accommodation member 30. The boot 46 is connected to a rear end portion of the exterior housing 44 and covers the fixation member 32 of the metal housing 26. A rear end portion of the boot 46 and the jacket 9 of the optical cable 3 are connected to each other using an adhesive agent (not shown).

The electrical connector 22 is a portion which is inserted into a connection target (computer or the like) and electrically connected to the connection target. The electrical connector 22 is disposed at a front end side of the housing 20 and protrudes forward from the housing 20. The electrical connector 22 is electrically connected to the circuit substrate 24 via a terminal 22a.

Figure 4A:
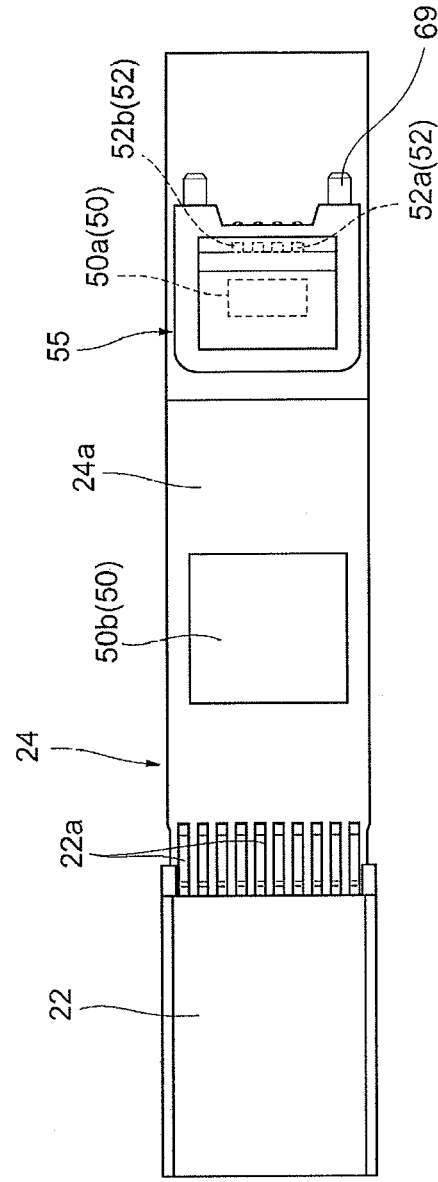
FIG. 4(a) is a view of the substrate shown in FIG. 3 when seen from above and FIG. 4(b) is a view of the substrate shown in FIG. 3 when seen from the side.
Figure 4B:
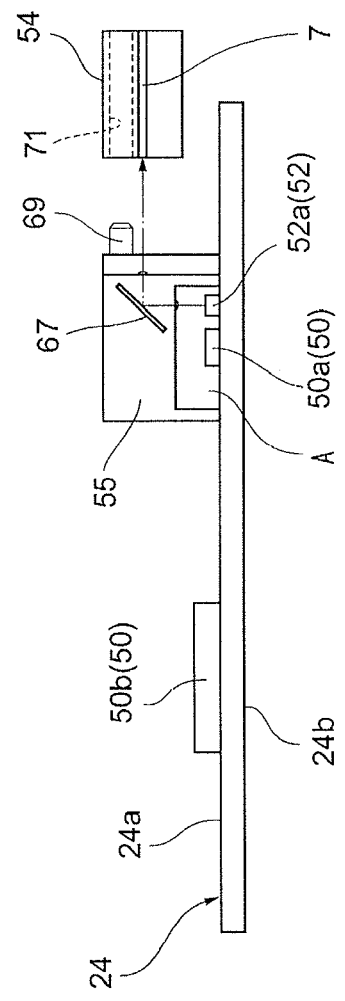

The circuit substrate 24 is accommodated in the accommodation space of the metal housing 26 (accommodation member 30). As shown in FIGS. 4A and 4B, a control semiconductor 50 and light emitting and receiving elements 52 are mounted on the circuit substrate 24. The circuit substrate 24 electrically connects the control semiconductor 50 to the light emitting and receiving elements 52. The circuit substrate 24 has an approximately rectangular shape in planar view and a predetermined thickness. The circuit substrate 24 is, for example, an insulating substrate such as a glass epoxy substrate and a ceramic substrate. A circuit wiring of gold (Au), aluminum (Al), copper (Cu), or the like is formed on the surface or the inside of the circuit substrate 24. The control semiconductor 50 and the light emitting and receiving elements 52 constitute a photoelectric conversion portion.

The control semiconductor 50 includes a driving IC (integrated circuit) 50a or a CDR (clock data recovery) device 50b as a waveform shaper. The control semiconductor 50 is disposed at a front end side of a surface 24a in the circuit substrate 24. The control semiconductor 50 is electrically connected to the electrical connector 22.

The light emitting and receiving elements 52 include a plurality (2 elements in this example) of light emitting elements 52a and a plurality (2 elements in this example) of light receiving elements 52b. The light emitting elements 52a and the light receiving elements 52b are disposed at a rear end side of the surface 24a in the circuit substrate 24. Light emitting diodes (LED), laser diodes (LD), a vertical cavity surface emitting laser (VCSEL), or the like can be used as the light emitting elements 52a, for example. Photodiodes (PD) can be used as the light receiving elements 52b, for example.

The light emitting and receiving elements 52 are optically connected to the optical fibers 7 of the optical cable 3. Specifically, as shown in FIG. 4B, a lens array component (lens component) 55 is disposed on the circuit substrate 24 so as to cover the light emitting and receiving elements 52 and the driving IC 50a.

The lens array component 55 is coupled to a connector component 54 attached to an end of the optical fibers 7. In the lens array component 55, light emitted from the light emitting elements 52a is input to the optical fibers 7 and light transmitted through the optical fibers 7 is input to the light receiving elements 52b. Accordingly, the optical fibers 7 and the light emitting and receiving elements 52 are optically coupled to each other.

In the optical module 1 having the above-described configuration, an electrical signal is input to the control semiconductor 50 through wiring of the circuit substrate 24 from the electrical connector 22. The electrical signal input to the control semiconductor 50 is output to the light emitting and receiving elements 52 through the wiring of the circuit substrate 24 from the control semiconductor 50 after performing level adjustment or waveform shaping using the CDR device 50b, or the like. The light emitting and receiving elements 52 to which the electrical signal is input convert the electrical signal into an optical signal and outputs the optical signal to the optical fibers 7 through the lens array component 55 from the light emitting elements 52a.

In addition, the optical signal transmitted through the optical cable 3 enters the light receiving elements 52b through the lens array component 55. The light emitting and receiving elements 52 convert the input optical signal into an electrical signal and output the electrical signal to the control semiconductor 50 through the wiring of the circuit substrate 24. In the control semiconductor 50, the electrical signal is subjected to a predetermined process, and then, the electrical signal is output to the electrical connector 22.

Figure 5:
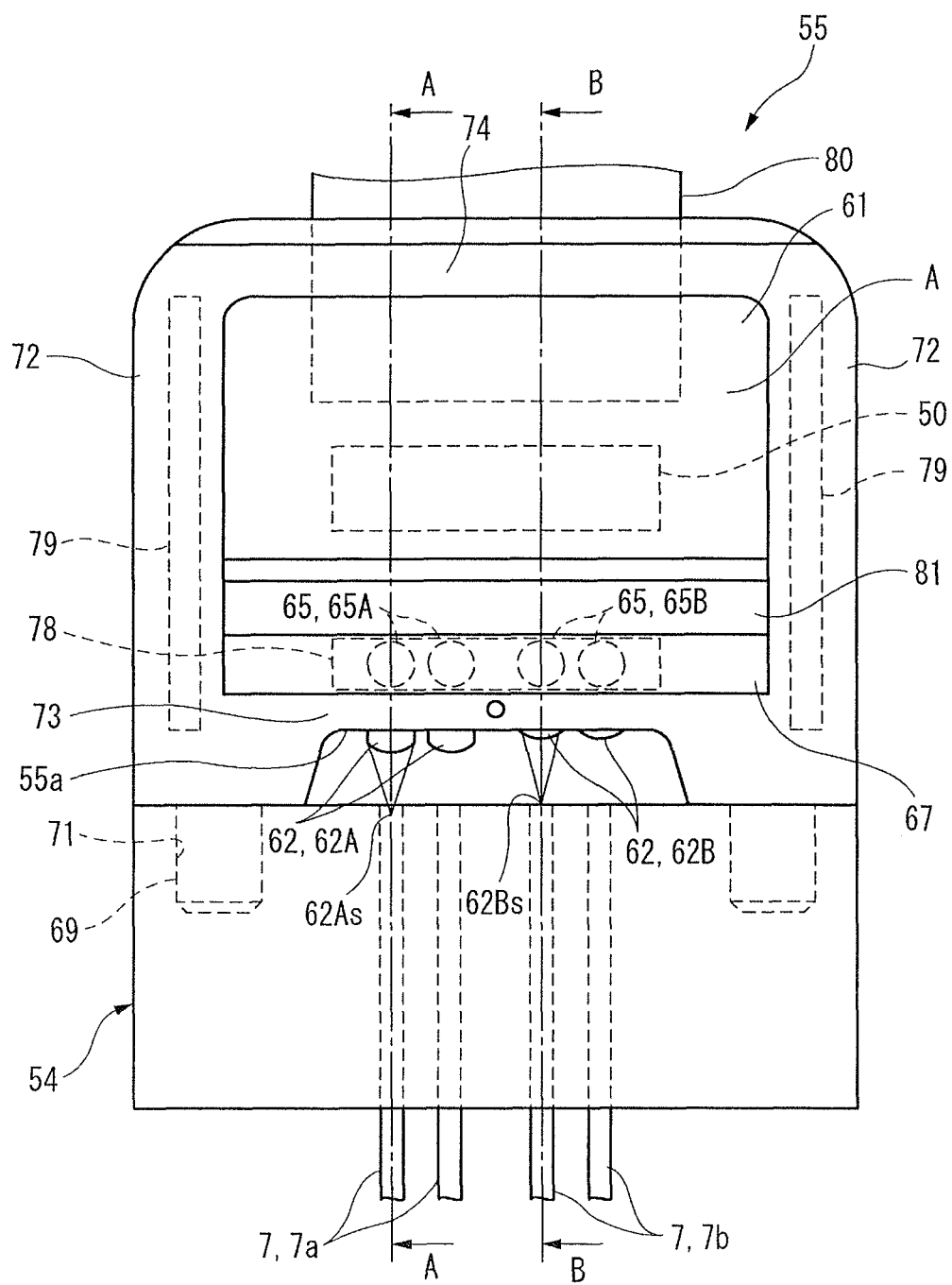
FIG. 5 is a planar view of a lens array component according to the present embodiment.
Figure 6:
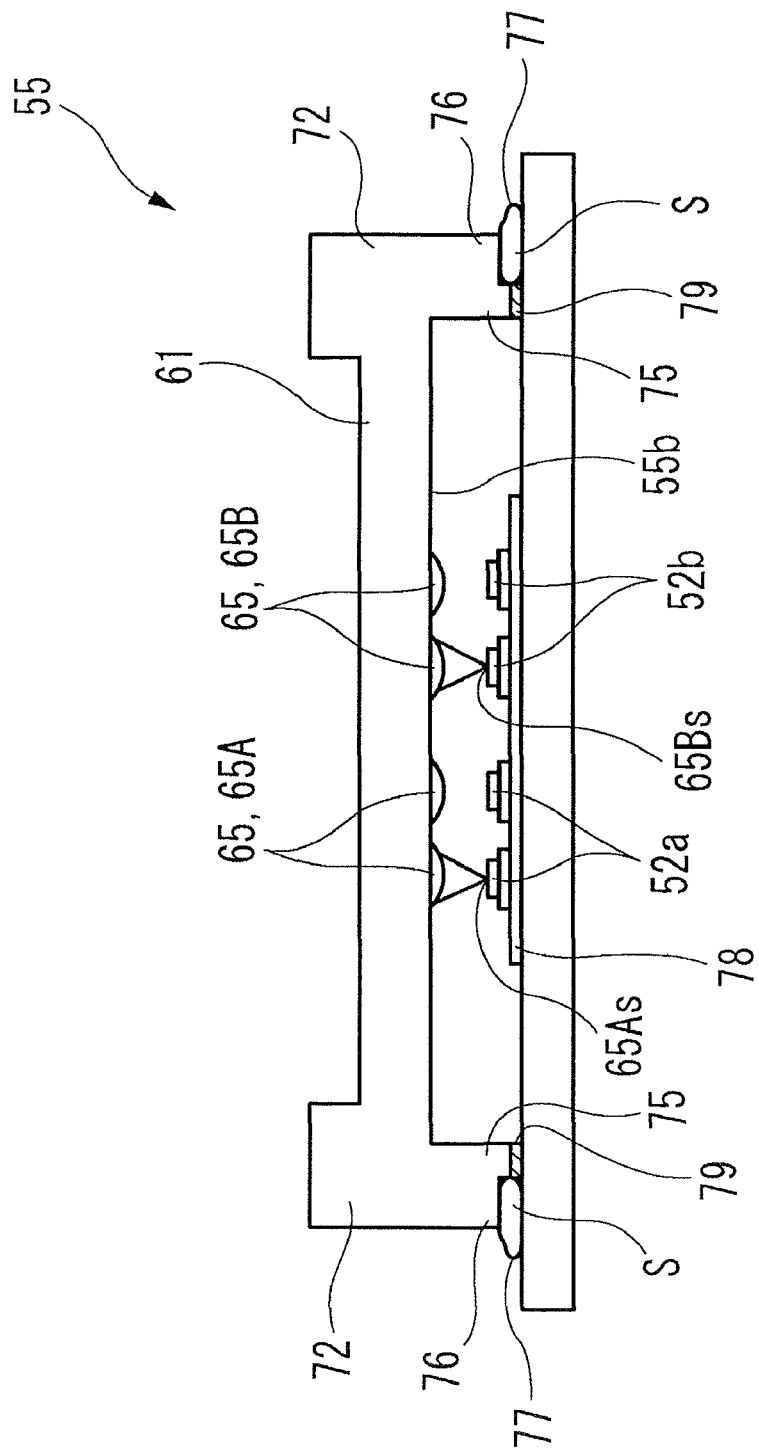
FIG. 6 is a cross-sectional view of the lens array component along a width direction according to the present embodiment.
Figure 7:
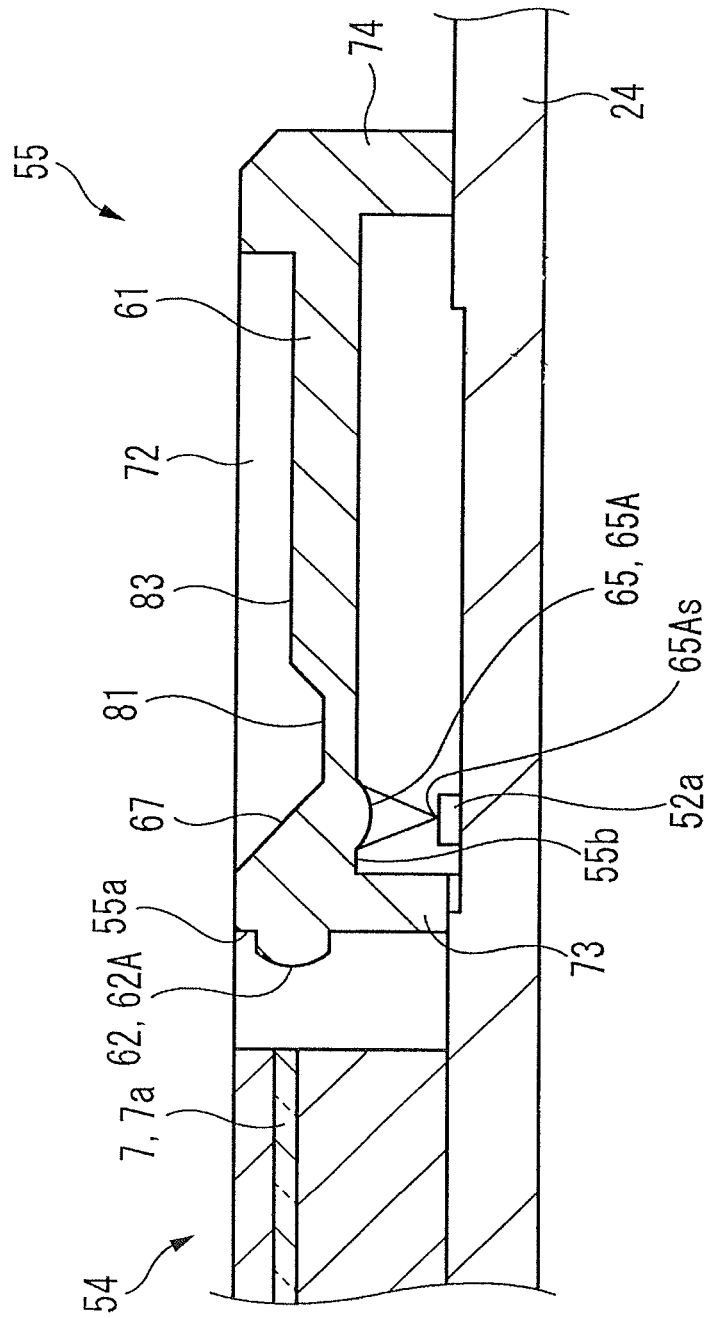
FIG. 7 is a cross-sectional view taken along line A-A of the lens array component of FIG. 5.
Figure 8:
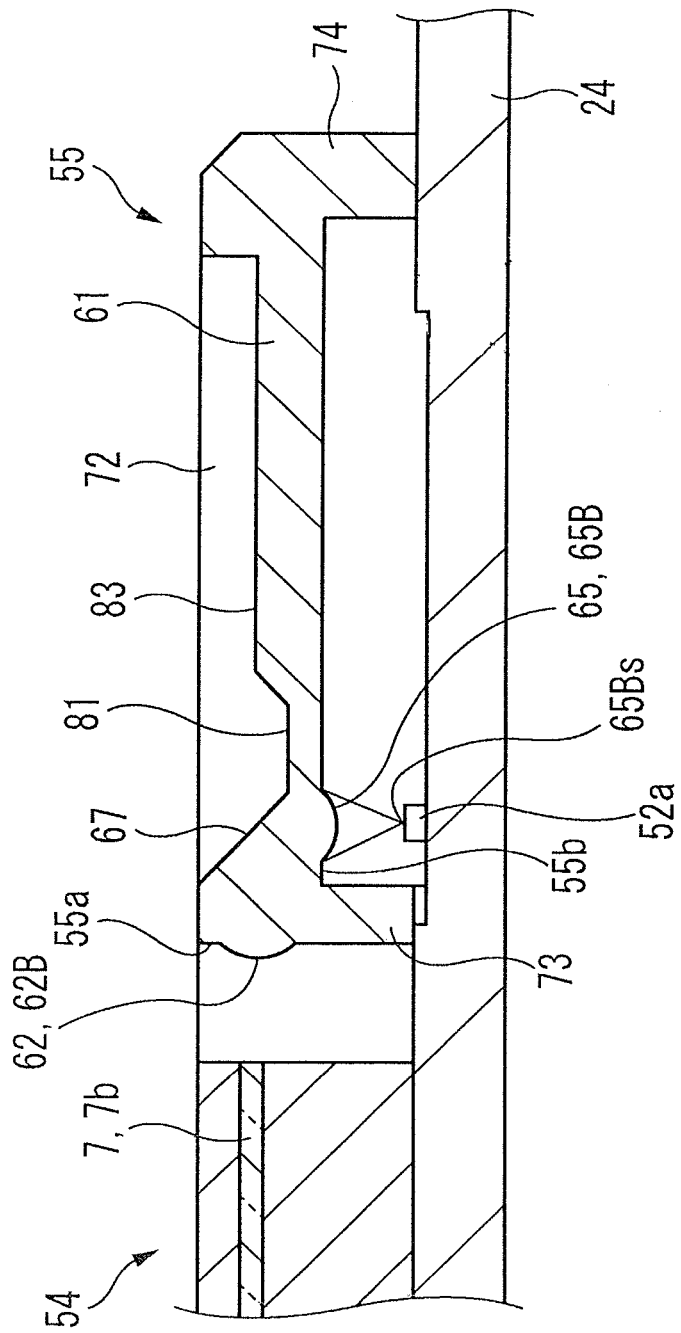
FIG. 8 is a cross-sectional view taken along line B-B of the lens array component of FIG. 5.
Figure 9:
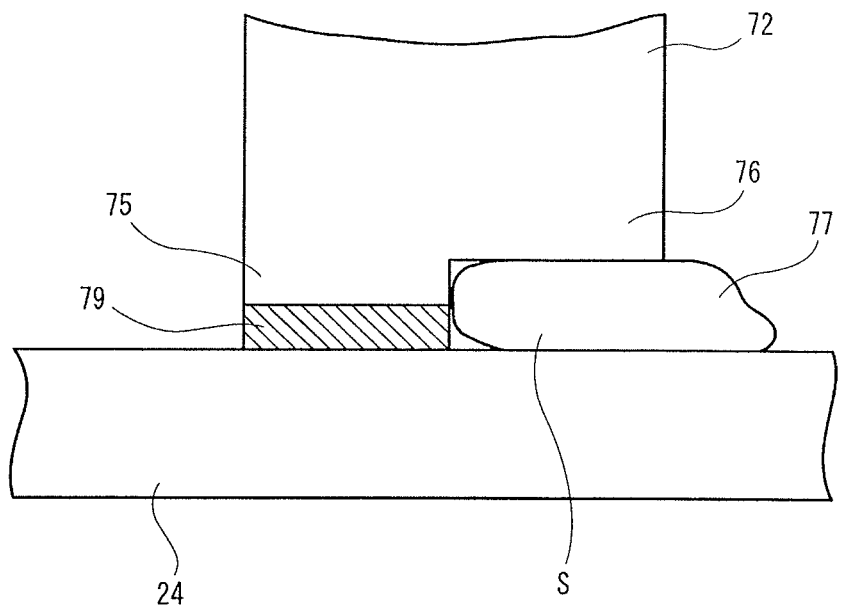
FIG. 9 is an enlarged cross-sectional view showing a site of fixing the lens array component to a circuit substrate, along a width direction.

The lens array component 55 will be described with reference to FIGS. 5 to 9. FIG. 5 is a planar view of the lens array component according to the present embodiment. FIG. 6 is a cross-sectional view of the lens array component along a width direction according to the present embodiment. FIG. 7 is a cross-sectional view taken along line A-A of the lens array component of FIG. 5. FIG. 8 is a cross-sectional view taken along line B-B of the lens array component of FIG. 5. FIG. 9 is an enlarged cross-sectional view showing a site of fixing the lens array component to the circuit substrate, along a width direction.

As shown in FIGS. 5 to 8, the lens array component 55 has a fiber-side connection surface 55a that faces the optical fibers 7. A plurality of fiber-side lens portions 62 are formed on the fiber-side connection surface 55a. In addition, the lens array component 55 has an element-side connection surface 55b that faces the light emitting and receiving elements 52. A plurality of element-side lens portions 65 (lens portions) are formed on the element-side connection surface 55b.

The plurality of fiber-side lens portions 62 and the plurality of element-side lens portions 65 are arranged in one direction and have different optical axes to each other. In addition, the lens array component 55 has a reflecting surface 67. The reflecting surface 67 is optically connected to the fiber-side lens portions 62 and the element-side lens portions 65 which have different optical axes to each other.

The fiber-side lens portions 62 and the element-side lens portions 65 are formed of a collimator lens in which incident light is regarded as parallel light and the parallel light is collected and emitted. Such a lens array component 55 is integrally formed through injection molding of resin.

Two of the four fiber-side lens portions 62 are set as fiber-side lens portions for transmission 62A that face transmission-side optical fibers 7a of the optical signal and the other two thereof are set as fiber-side lens portions for reception 62B that face reception-side optical fibers 7b of the optical signal.

In addition, two of the four element-side lens portions 65 are set as element-side lens portions for transmission 65A that face the light emitting elements 52a and the other two thereof are set as element-side lens portions for reception 65B that face the light receiving elements 52b.

The lens array component 55 has a plate-like portion 61 extending in a direction intersecting with the arrangement direction of the fiber-side lens portions 62. The plate-like portion 61 is provided at a side opposite to the fiber-side lens portions 62 with respect to the reflecting surface 67. The plate-like portion 61 is formed so as to extend in a direction intersecting with the arrangement direction of the element-side lens portions 65.

The lens array component 55 has a front end rib portion 73 formed thicker than the plate-like portion 61 at a front end side. A rear end rib portion 74 is formed at a rear end side of the plate-like portion 61 in the width direction.

In addition, guide pins 69 protruding to the connector component 54 are formed at adjacent parts of both ends of the front end rib portion 73 of the lens array component 55. The guide pins 69 can be inserted into a positioning hole 71 which is formed on a connection end surface of the connector component 54 as shown in FIG. 4B. The connector component 54 is positioned with respect to the lens array component 55 by inserting the guide pins 69 into the positioning hole 71 and the optical fibers 7 are disposed at a position opposite to the fiber-side lens portions 62.

In addition, a recess 81 is formed on the upper surface of the plate-like portion 61. In the recess 81, the wall surface at a connection side is made to be an inclined surface which is gradually inclined upward to the connection side and the inclined surface forms a part of the reflecting surface 67.

A flat portion 83 formed in a planar shape is formed on the upper surface of the plate-like portion 61 at a side opposite to the connection side of the recess 81. The flat portion 83 is formed adjacent to the reflecting surface 67 through the recess 81.

In the above-described lens array component 55, the optical signal from the light emitting elements 52a of the light emitting and receiving elements 52 is input to the element-side lens portions for transmission 65A and then reflected by the reflecting surface 67, so that the optical path is changed to the connection side. The optical signal is further transmitted along the extending direction of the plate-like portion 61, output from the fiber-side lens portions for transmission 62A, and reaches the transmission-side optical fibers 7a. Such a region including the transmission-side optical fibers 7a, the light emitting elements 52a, the fiber-side lens portions for transmission 62A (first lens portions) that face the transmission-side optical fibers 7a, and the element-side lens portions for transmission 65A (second lens portions) that face the light emitting elements 52a is referred to as a transmission-side optical system.

In addition, the optical signal from the reception-side optical fibers 7b is input to the fiber-side lens portions for reception 62B, is transmitted along the extending direction of the plate-like portion 61, and then, is reflected by the reflecting surface 67, so that the optical path is changed downward. The optical signal is further output from the element-side lens portions for reception 65B and reaches the light receiving elements 52b of the light emitting and receiving elements 52. Such a region including the reception-side optical fibers 7b, the light receiving elements 52b, the fiber-side lens portions for reception 62B (third lens portions) that face the reception-side optical fibers 7b, and the element-side lens portions for reception 65B (fourth lens portions) that face the light receiving elements 52b is referred to as a reception-side optical system.

Accordingly, the optical signal is transmitted through the lens array component 55 between the optical fibers 7 and the light emitting and receiving elements 52.

As shown in FIGS. 5 to 9, the lens array component 55 has a pair of legs 72. The pair of legs 72 is formed at both sides of the plate-like portion 61 and extends from the rear end side to the front end side. The legs 72 have a positioning portion 75, which protrudes to the circuit substrate 24, and an adhesion portion 76 which is adjacent to the positioning portion 75.

The positioning portions 75 separate the element-side lens portions 65 of the lens array component 55 from the circuit substrate 24 by a predetermined distance and are provided at positions facing each other with the element-side lens portions 65 interposed therebetween. The positioning portion 75 protrudes toward the circuit substrate 24 more than the adhesion portion 76. Accordingly, in the tip end surface of the circuit substrate 24 side of the legs 72, only the positioning portion 75 contacts with the circuit substrate 24.

In addition, in a state where the positioning portion 75 contacts with the circuit substrate 24, there is a gap between the adhesion portion 76 and the circuit substrate 24. The gap is set as an adhesive-agent filling space S. The adhesive-agent filling space S is filled with an adhesive agent 77. The lens array component 55 is adhesively fixed to the circuit substrate 24 using the adhesive agent 77.

As shown in FIG. 6, the adhesion portion 76 is formed such that a portion of a side surface of the lens array component 55 is recessed and the adhesive-agent filling space S extends along a protruding direction (perpendicular direction to the mounting surface of the circuit substrate 24) of the positioning portion 75. In addition, the adhesive agent 77 is filled into the adhesive-agent filling space S such that the thickness along a surface direction of the circuit substrate 24 becomes largest between the side of the adhesion portion 76 closest to the circuit substrate 24 and the circuit substrate 24.

The mounting surface of the circuit substrate 24 on which the lens array component 55 is mounted is provided with a first metal pad 78 and a second metal pad 79 formed of a metal thin film. The second metal pads 79 are formed at places corresponding to the positioning portions 75 of the lens array component 55 so as to face each other with the first metal pads 78 interposed therebetween. The light emitting and receiving elements 52 are mounted on the first metal pad 78.

In addition, the positioning portion 75 of the lens array component 55 is mounted on the second metal pad 79 in a state in which the positioning portion 75 contacts with the second metal pad 79. Accordingly, the adhesive agent 77 is prevented from being interposed between the second metal pad 79 and the positioning portion 75 of the lens array component 55.

The first metal pad 78 and the second metal pad 79 are formed on the mounting surface of the circuit substrate 24 through the same process, and therefore, each thickness thereof is made equal. Accordingly, the upper surfaces of the first metal pad 78 and the second metal pad 79 are positioned at the same height. For this reason, the separation distance between the light emitting and receiving elements 52 and the element-side lens portions 65 of the lens array component 55 can be managed by the distance of the positioning portion 75 of the lens array component 55 from the element-side lens portions 65. Accordingly, it becomes easy to design the optical module 1 including the lens array component 55.

As shown in FIG. 5, the circuit substrate 24 is provided with electrical wiring 80 connected to the light emitting and receiving elements 52, the control semiconductor 50, or the like. The electrical wiring 80 is connected to a control circuit that controls the light emitting and receiving elements 52 or the control semiconductor 50. The second metal pads 79 are provided at positions facing each other with the electrical wiring 80 interposed therebetween.

The lens array component 55 configured as described above is fixed to the circuit substrate 24 in a state where the positioning portion 75 contacts with the second metal pad 79 of the circuit substrate 24 and the adhesive agent 77 is interposed between the adhesion portion 76 and the second metal pad 79. That is, the adhesive agent 77 does not affect the distance between the element-side lens portions 65 and the light emitting and receiving elements 52 in the optical axis direction. Therefore, it is possible to prevent the distance between the element-side lens portions 65 and the light emitting and receiving elements 52 in the optical axis direction from varying due to variations of the filling amount of the adhesive agent 77 or the like. Accordingly, it is possible to position the element-side lens portions 65 and the light emitting and receiving elements 52 with high precision with respect to the optical axis direction. Therefore, it is possible to reduce coupling loss between the element-side lens portions 65 and the light emitting and receiving elements 52 and to provide an optical module 1 having high optical coupling efficiency.

In addition, the adhesive-agent filling space S, which does not affect the distance between the element-side lens portions 65 and the light emitting and receiving elements 52 in the optical axis direction, is formed between the adhesion portion 76 and the circuit substrate 24. The lens array component 55 is fixed to the circuit substrate 24 using the adhesive agent 77 filled into the adhesive-agent filling space S. Accordingly, it is possible to strongly and adhesively fix the lens array component 55 on the circuit substrate 24. The adhesive agent 77 may be applied to the circuit substrate 24 or to the adhesion portion 76.

As described above, the adhesive-agent filling space S extends along the protruding direction of the positioning portion 75. For this reason, it is possible to secure a large adhesive-agent filling space S compared to a case where the adhesion portion 76 is not provided. Accordingly, it is possible to fill a large amount of the adhesive agent 77 into the adhesive-agent filling space S and to increase shear strength with respect to the circuit substrate 24 of the lens array component 55.

In addition, when a shear force acts on the lens array component 55 from the side, a large stress acts on the adhesive agent positioned in the vicinity of the interface of the lens array component 55 and the circuit substrate 24. In the optical module 1 according to the present embodiment, the thickness along the surface direction of the circuit substrate 24 of the adhesive agent 77 is set largest between the side of the adhesion portion 76 closest to the circuit substrate 24 and the circuit substrate 24. That is, the thickness of the adhesive agent 77 of an area on which the large stress acts is set to be large. For this reason, the adhesive agent 77 is difficult to break even if a large shear force acts on the lens array component and it is possible to provide an optical module 1 having large shear strength.

In addition, in the above-described optical module 1, the lens array component 55 is provided with an accommodation space that accommodates the light emitting and receiving elements 52 and the driving IC 50a and the positioning portions 75 are provided so as to face each other with the accommodation space interposed therebetween. In addition, the second metal pads 79 with which the positioning portions 75 contact are provided at positions facing each other with the electrical wiring 80 interposed therebetween. Accordingly, the driving IC 50a is accommodated in the same accommodation space as that of the light emitting and receiving elements 52, and therefore, the driving state of the light emitting and receiving elements 52 is stabilized.

In addition, it is possible to mount the lens array component 55 on the circuit substrate 24 in a stable posture. Furthermore, the lens array component 55 does not contact with the vicinity of the electrical wiring 80 in the circuit substrate 24. Therefore, it is possible to prevent electrostatic capacitance of the circuit substrate 24 from varying and there is no case where the quality of the electrical signal being conducted through the electrical wiring 80 is affected. That is, it is possible to prevent deterioration of the quality of the electrical signal, caused by the installation of the lens array component 55 accommodating the driving IC 50a together with the light emitting and receiving elements 52.

However, in the optical module 1, in some cases, light, which is emitted from the fiber-side lens portions for transmission 62A after being incident to the element-side lens portions for transmission 65A from the light emitting elements 52a, is reflected at end surfaces of the transmission-side optical fibers 7a, thereby causing deterioration of the quality of the optical signal emitted from the light emitting elements 52a due to the reflection return light.

As a technique by which such reflection attenuation is reduced, it is considered that a shape of the lens of the lens portion be devised such that the reflected light from the end surfaces of the transmission-side optical fibers 7a is made not to be incident on the element-side lens portions for transmission 65A. However, in this case, the lens portion becomes complicated and the shape thereof becomes specialized, thereby increasing the manufacturing cost of the lens array component 55.

On the contrary, in the optical module 1 according to the present embodiment, a focal position 62As of the fiber-side lens portions for transmission 62A is offset in the optical axis direction by adjusting the protruding dimension of the fiber-side lens portions for transmission 62A from the fiber-side connection surface 55a.

Specifically, in the optical path through which the fiber-side lens portions for transmission 62A and the element-side lens portions for transmission 65A pass, the end surfaces of the transmission-side optical fibers 7a are positioned at a position which is offset from the focal position 62As of the fiber-side lens portions for transmission 62A in the optical axis direction such that the reflection return light intensity decreases by 10 dB or greater compared to a case where the optical coupling efficiency of the light emitting elements 52a and the transmission-side optical fibers 7a is maximum.

That is, according to the optical module 1 of the present embodiment, the reflection return light at the end surfaces of the transmission-side optical fibers 7a is prevented from being incident to the light emitting elements 52a by offsetting the focal position 62As of the fiber-side lens portions for transmission 62A in the optical axis direction. Accordingly, it is possible to suppress the deterioration of the signal quality. In addition, it is not necessary to mold the lens array component 55 to be complicated and into a special shape, and therefore, it is possible to avoid the increase of the manufacturing cost. Accordingly, it is possible to provide an optical module having high optical coupling efficiency at low cost.

Furthermore, in the transmission-side optical system of the optical module 1 of the present embodiment, it is necessary to suppress deterioration of communication quality due to the reflection return light and to provide high optical coupling efficiency. For this reason, it is necessary to suppress deterioration of the optical coupling efficiency due to other factors apart from the deterioration of the optical coupling efficiency due to the end surfaces of the transmission-side optical fibers 7a being positioned at the position which is offset from the focal position 62As of the fiber-side lens portions for transmission 62A in the optical axis direction. Specifically, the lens array component 55, the optical fibers 7, the light emitting and receiving elements 52, and the like constituting the optical module 1 may be designed as the following.

The following inequations (1) to (3) are established when the following variables are set such that:

the numerical aperture of the light emitting elements 52a is NA1, the numerical aperture of the transmission-side optical fibers 7a is NA2, the magnification of the transmission-side optical system is M, the diameter of light emitting surfaces of the light emitting elements 52a is $\Phi 1$, the maximum error of the mounting position of the light emitting elements 52a is d1, the core diameter of the transmission-side optical fibers 7a is $\Phi 2$, and the maximum error of the mounting position of the transmission-side optical fibers 7a is d2.

$$M\Phi 1 < \Phi 2 \tag{1}$$

$$M(d1 + \Phi 1/2) < \Phi 2/2 - d2 \tag{2}$$

$$NA1/M < NA2 \tag{3}$$

Here, the attachment precision of the lens array component 55 with respect to the substrate 24 and the connector component 54 will be described. More specifically, the deviation amount of the lens portions 62 and 65 of the lens array component 55, with respect to the light emitting and receiving elements 52 or with respect to the end surfaces of the optical fibers 7 will be described.

First, the deviation amount from an ideal attachment position in a direction perpendicular to the optical axis between the lens portions 62A and 65A in the transmission-side optical system and the light emitting elements 52a and the end surface of the transmission-side optical fibers 7a will be described. The ideal attachment position is a position when the optical coupling efficiency between the fiber-side lens portions for transmission 62A and the transmission-side optical fibers 7a shows maximum efficiency.

The deviation amount with respect to this direction for example, the deviation amount of the transmission-side optical fibers 7a with respect to the fiber-side lens portions for transmission 62A is set such that, the decrease of the optical coupling efficiency with respect to the maximum efficiency at the ideal attachment position is 1 dB or less. Furthermore, in the transmission side optical path through which the fiber-side lens portions for transmission 62A and the element-side lens portions for transmission 65A pass, the deviation amount is set such that the reflection return light intensity decreases by 10 dB or greater compared to a case where the optical coupling efficiency of the light emitting elements 52a and the transmission-side optical fibers 7a is maximum.

Figure 10:
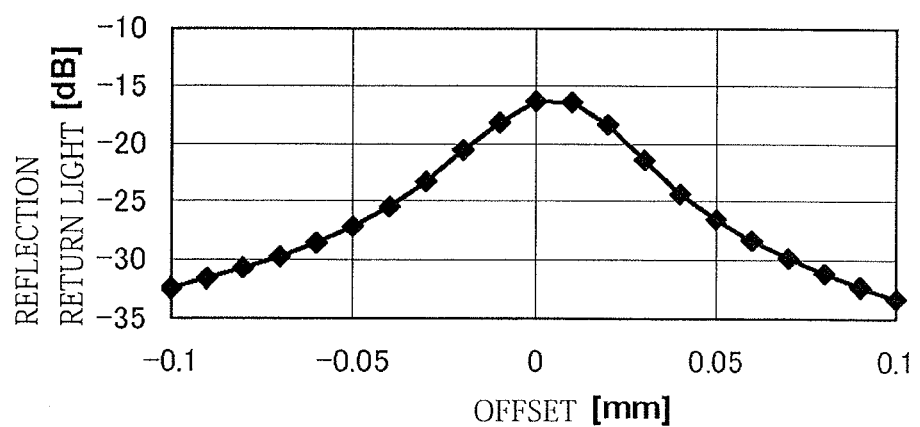
FIG. 10 is a graph showing a relationship between an offset amount from a focal position of a fiber-side lens portion for transmission, and the reflection return light intensity.

First, this will be described from the latter perspective, that is, from a perspective of the reflection return light intensity. FIG. 10 is a graph showing a relationship between an offset amount from the focal position 62As of the fiber-side lens portions for transmission 62A in the optical axis direction, and the reflection return light intensity. In FIG. 10, in regards to the fiber-side lens portions for transmission 62A, end surfaces of the transmission-side optical fibers 7a having a core diameter $\phi$ of 70 μm are positioned at a position which is offset from the focal position 62As of the fiber-side lens portions for transmission 62A in the optical axis direction. The horizontal axis indicates the offset amount (mm) and the vertical axis indicates the reflection return light intensity (dB).

When the offset amount is 0 mm, that is, when the end surfaces of the transmission-side optical fibers 7a are disposed at the focal position 62As of the fiber-side lens portions for transmission 62A, the optical coupling efficiency of the light emitting elements 52a and the transmission-side optical fibers 7a is maximum. The reflection return light intensity decreases as the offset amount increases compared to the case where the offset amount is 0 mm. With the offset amount of being 50 μm (0.05 mm) or more, the reflection return light intensity decreases by 10 dB or greater compared to the case where the optical coupling efficiency is maximum.

Figure 11:
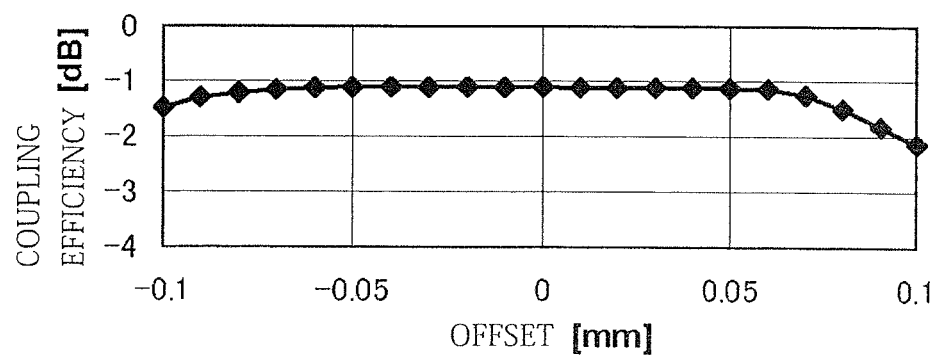
FIG. 11 is a graph showing a relationship between an offset amount from a focal position of a fiber-side lens portion for transmission, and the optical coupling efficiency.

In contrast, FIG. 11 is a graph showing a relationship between the offset amount from the focal position 62As of the fiber-side lens portions for transmission 62A in the optical axis direction, and the optical coupling efficiency. In FIG. 11, end surfaces of the transmission-side optical fibers 7a having a core diameter $\phi$ of 70 vim are positioned at a position which is offset from the focal position 62As of the fiber-side lens portions for transmission 62A in the optical axis direction.

It can be seen that the optical coupling efficiency decreases as the offset amount increases compared to when the offset amount is 0 mm, that is, when the end surfaces of the transmission-side optical fibers 7a are disposed at the focal position 62As of the fiber-side lens portions for transmission 62A. When the offset amount is 100 μm (0.1 mm) or less, the decrease of the optical coupling efficiency with respect to the maximum efficiency is 1 dB or less.

Figure 12:
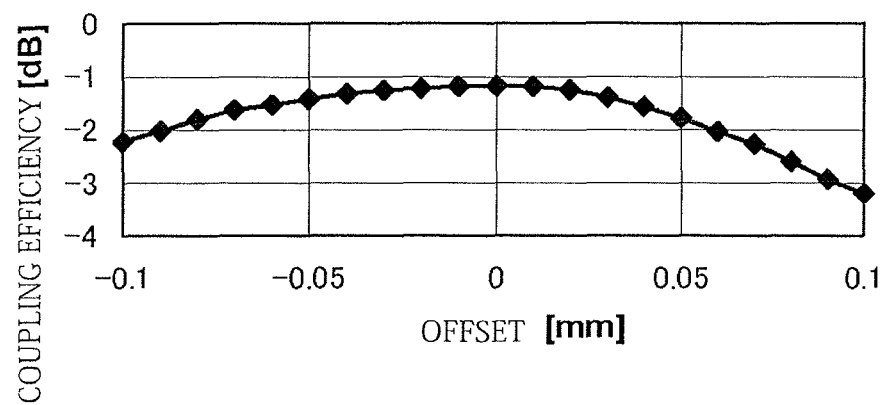
FIG. 12 is a graph showing a relationship between an offset amount from a focal position of a fiber-side lens portion for transmission, and the optical coupling efficiency.

FIG. 12 is a graph which is shown for a comparison and shows a relationship between an offset amount (mm) and the optical coupling efficiency (dB) when using transmission-side optical fibers 7a having a core diameter $\phi$ of 62.5 μm. In this case, when the offset amount is 100 μm (0.1 mm) or less, the decrease of the optical coupling efficiency with respect to the maximum efficiency is more than 1 dB, and therefore, it is preferable that the core diameter of the optical fiber be 70 μm or greater.

Consequently, when the offset amount is 50 μm to 100 μm, the reflection return light intensity decreases by 10 dB or greater compared to the case where the optical coupling efficiency of the light emitting elements 52a and the transmission-side optical fibers 7a is maximum. Moreover, the decrease of the optical coupling efficiency with respect to the case where the optical coupling efficiency of the light emitting elements 52a and the transmission-side optical fibers 7a is maximum is 1 dB or less. Thus, the communication quality is extremely good.

Consequently, if the above-described inequation (1) is satisfied, it is possible to make the light emitted from the light emitting elements 52a be incident on the transmission-side optical fibers 7a. If the above-described inequation (2) is satisfied, it is possible to make the light emitted from the light emitting elements 52a be incident on the transmission-side optical fibers 7a even if the light emitting elements 52a and the transmission-side optical fibers 7a have most deviation from the ideal attachment position with respect to the lens array component 55. If the above-described inequation (3) is satisfied, it is possible to make the light from the element-side lens portions for transmission 65A be incident on the end surface of the fiber-side lens portions for transmission 62A.

Consequently, it is possible to suppress the generation of the coupling loss due to the positional deviation in an in-plane direction perpendicular to the optical axis and to realize the optical module 1 having high optical coupling efficiency by establishing the above-described inequations (1) to (3).

Accordingly, in the optical module of the present embodiment, an optical module is realized that has high optical coupling efficiency and can suppress the deterioration of the communication quality due to the reflection return light by the tip ends of the transmission-side optical fibers 7a being positioned at a position which is offset from the focal position of the fiber-side lens portions for transmission 62A (first lens portions) by a predetermined amount in the optical axis direction and by the above-described inequations (1) to (3) being set to be established.

In order to mount the lens array component 55 on the circuit substrate 24 so as to conform to such conditions, typically, the following process may be implemented.

First, the adhesive agent 77 is applied to the position of the second metal pad 79 of the circuit substrate 24. Next, the positioning portion 75 of the lens array component 55 is brought into contact with the second metal pad 79 of the circuit substrate 24. At this time, the adhesive agent 77 is released to the adhesive-agent filling space S and the lens array component 55 is positioned with respect to the vertical direction (height direction) of the circuit substrate 24.

In this state, the light emitting elements 52a and 52b are observed through the fiber-side lens portions for transmission 62A and the fiber-side lens portions for reception 62B (third lens portions) and the lens array component 55 is finely adjusted in a direction horizontal to the circuit substrate 24 so that the light emitting and receiving elements 52 are disposed in the center of the visual field. In this manner, the maximum error d1 of the mounting position of the light emitting elements 52a can be managed.

Then, the connector component 54 is positioned with respect to the lens array component 55 by coupling both of the guide pins 69 and the positioning hole 71 by inserting the guide pins 69 of the lens array component 55 into the positioning hole 71 of the connector component 54 to which optical fibers are fixed. Accordingly, the maximum error d2 of the mounting position of the transmission-side optical fibers 7a can be managed.

Next, the relationship between the lens portions 62 and 65 in the reception-side optical system and the light emitting and receiving elements 52 or the end surfaces of the optical fibers 7 will be described. The reception-side optical system is set such that the decrease of the total optical coupling efficiency in the transmission-side optical system and the reception-side optical system with respect to the maximum efficiency is 3 dB to 6 dB. It is possible to favorably maintain the communication quality and to reliably prevent the light intensity from exceeding the maximum light-receivable light intensity of the light receiving element by decreasing the optical coupling efficiency in the reception-side optical system in this manner.

Such a reception-side optical system is further provided with the reception-side optical fibers 7b; the light receiving elements 52b; and the fiber-side lens portions for reception 62B (third lens portions) and the element-side lens portions for reception 65B (fourth lens portions) by which the reception-side optical fibers 7b and the light receiving elements 52b are optically connected.

The fiber-side lens portions for reception 62B are disposed such that the end surfaces of the reception-side optical fibers 7b are positioned at a focal position 62Bs of the fiber-side lens portions for reception. In addition, the element-side lens portions for reception 65B are disposed such that the light receiving surfaces of the light receiving elements 52b are positioned at a focal position 65Bs of the element-side lens portions for reception.

Furthermore, it is preferable that at least one of the fiber-side lens portions for reception 62B and the element-side lens portions for reception 65B be an aspherical lens that decreases the optical coupling efficiency in the reception-side optical system by not optically coupling a portion of light emitted from the reception-side optical fibers 7b. For example, an optical coupling region in which the reception-side optical fibers 7b and the light receiving elements 52b are optically coupled may be provided in the center of the lens and a non-optical coupling region in which the reception-side optical fibers 7b and the light receiving elements 52b are not optically coupled may be provided in the periphery thereof.

Accordingly, the fiber-side lens portions for reception 62B and the reception-side optical fibers 7b are easily optically connected to each other at a predetermined optical coupling efficiency. That is, when the end surfaces of the reception-side optical fibers 7b are positioned at the focal position 62Bs of the fiber-side lens portions for reception 62B, it is possible to accurately dispose the reception-side optical fibers 7b and the light receiving elements 52b with respect to the lens array component 55 at a position at which the reception-side optical fibers 7b and the light receiving elements 52b are optically coupled at a predetermined optical coupling efficiency. For this reason, the protruding dimension of the fiber-side lens portions for transmission 62A from the fiber-side connection surface 55a is set to be large with respect to the fiber-side lens portions for reception 62B. Accordingly, suppression of the high optical coupling efficiency and suppression of the reflection return light are realized in the transmission-side optical system and a predetermined optical coupling efficiency is realized in the reception-side optical system.

As described above, in the optical module 1 according to the present embodiment, under consideration that the reflection attenuation is dominantly caused by reflection return light between the light emitting elements 52a and the transmission-side optical fibers 7a in the transmission-side optical system of the optical module 1, the reflection attenuation is improved by adjusting the protruding dimension of the fiber-side lens portions for transmission 62A from the fiber-side connection surface 55a.

Hereinabove, the present invention has been described using the embodiment, but the technical scope of the present invention is not limited to the scope of the description of the above-described embodiment. It is obvious for those skilled in the art that it is possible to add various modifications or improvements to the above-described embodiment.

For example, in the above-described embodiment, the positioning portions 75 are provided at positions facing each other with the element-side lens portions 65 interposed therebetween and is positioned by being brought into contact with the second metal pad 79 of the circuit substrate 24, the second metal pads being provided at positions facing each other with the electrical wiring 80 interposed therebetween. However, the present invention is not limited to this example.

Figure 13:
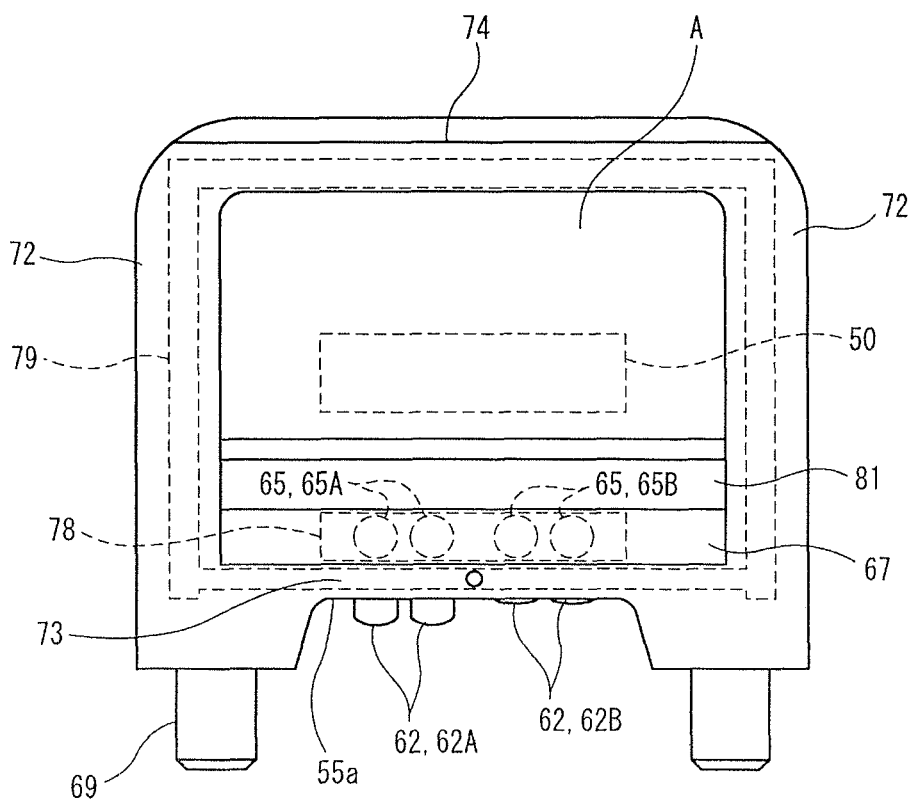
FIG. 13 is a planar view of a lens array component according to a modified example of the present embodiment.

FIG. 13 is a planar view of a lens array component according to a modified example of the present embodiment. As shown in FIG. 13, the lens array component 55 may be provided with the positioning portion 75 and the adhesion portion 76 at a periphery of the element-side lens portions 65 so as to surround the element-side lens portions 65. The positioning portion 75 may be positioned on the circuit substrate 24 by being brought into contact with the second metal pad 79 provided so as to surround the first metal pad 78.

According to the structure, the adhesive-agent filling space S is formed so as to surround the element-side lens portions 65 using the adhesion portion 76. Accordingly, it is possible to seal the periphery of the light emitting and receiving elements 52 and the element-side lens portions 65 using an adhesive agent 77 filled into the adhesive-agent filling space S. Accordingly, it is possible to prevent fine particles or the like from being attached to or to prevent condensation from being generated on the surfaces of the light emitting and receiving elements 52 or the element-side lens portions 65 and it is possible to maintain a good state of optical transmission at all times.

As a positioning structure of the lens array component 55 on the circuit substrate 24, a structure in which the positioning portion 75 contacts with the second metal pad 79 at three points may be adopted. It is thus possible to more stably position and mount the entire lens array component 55 on the circuit substrate 24 with higher precision.

Next, a modified example of the positioning portion 75 and the adhesion portion 76 of the lens array component 55 will be described.

Figure 14A:
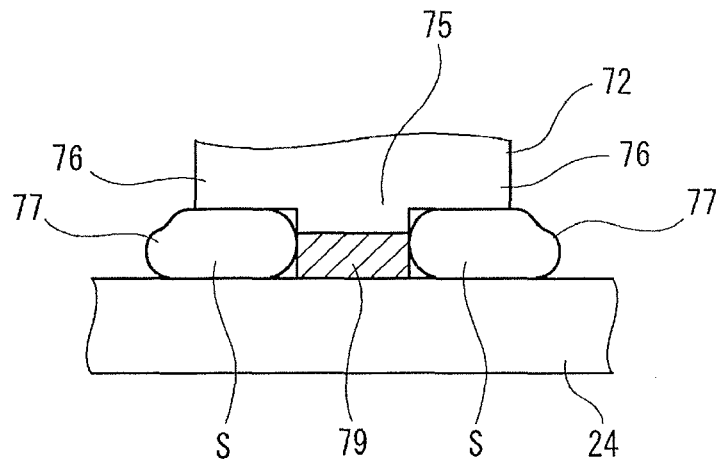
FIGS. 14A to 14C are respectively enlarged cross-sectional views of the lens array component in the site of fixing the lens array component to the circuit substrate, along a width direction.
Figure 14B:
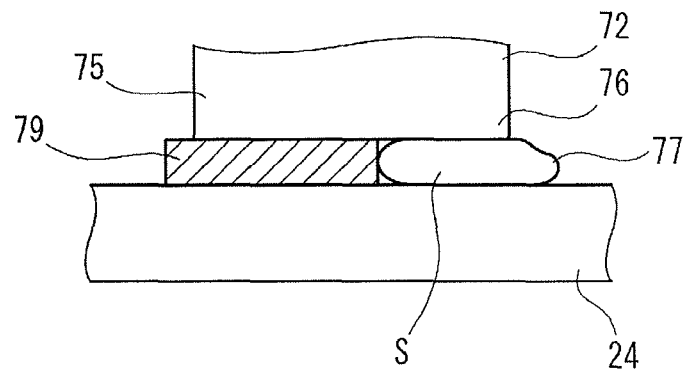
Figure 14C:
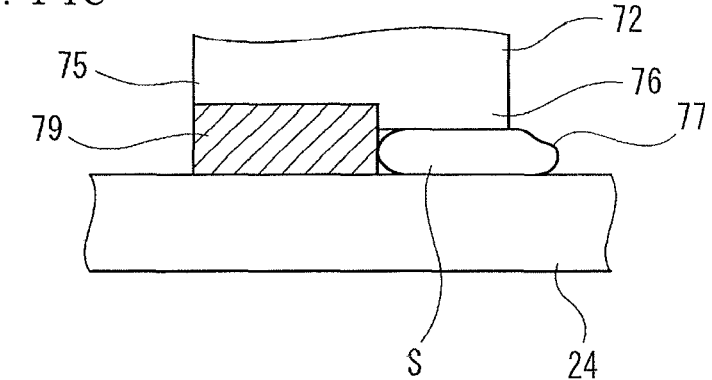

FIGS. 14A to 14C are views showing a site of fixing the lens array component to a circuit substrate according to a modified example. FIGS. 14A to 14C are respectively enlarged cross-sectional views of the lens array component in the site of fixing the lens array component to the circuit substrate, along a width direction.

In the lens array component 55 shown in FIG. 14A, the adhesion portion 76 is provided at both sides of the positioning portion 75. The positioning portion 75 protrudes to the side of the circuit substrate 24 more than the adhesion portion 76. In the lens array component 55, the adhesive-agent filling space S is formed at both sides of the positioning portion 75 by bringing the positioning portion 75 into contact with the second metal pad 79. The lens array component 55 is adhesively fixed to the circuit substrate 24 by filling the adhesive agent 77 into the adhesive-agent filling space S at both sides of the positioning portion 75. According to the lens array component 55, it is possible to strongly and adhesively fix each leg 72 to the circuit substrate 24 with good balance.

In the lens array component 55 shown in FIG. 14B, the positioning portion 75 and the adhesion portion 76 are on the same surface. In addition, on the circuit substrate 24, the second metal pad 79 is formed at a position deviated from a tip end surface of the leg 72 so that only a portion of the tip end surface of the leg 72 contacts with the second metal pad 79.

In the lens array component 55, an adhesive-agent filling space S having a thickness corresponding to that of the second metal pad 79 is formed between the other portion of the positioning portion 75 as an adhesion portion 76 and the circuit substrate 24 by bringing a portion of the leg 72 as a positioning portion 75 into contact with the second metal pad 79. The lens array component 55 is adhesively fixed to the circuit substrate 24 by filling the adhesive-agent filling space S with the adhesive agent 77. Particularly, according to the lens array component 55, the molding of the lens array component 55 becomes easy and it is possible to reduce the manufacturing cost by setting the positioning portion 75 and the adhesion portion 76 to be on the same surface.

The lens array component 55 shown in FIG. 14C is formed such that the adhesion portion 76 formed at one side of the positioning portion 75 protrudes to the side of the circuit substrate 24 more than the positioning portion 75. In addition, a second metal pad 79 which is thicker than the protruding dimension of the adhesion portion 76 is formed on the circuit substrate 24.

In the lens array component 55, the adhesive-agent filling space S is formed between the adhesion portion 76 and the circuit substrate 24 if the positioning portion 75 is brought into contact with the second metal pad 79. The lens array component 55 is adhesively fixed to the circuit substrate 24 by filling the adhesive-agent filling space S with the adhesive agent 77.

In the lens array component 55, it is possible to simply position the lens array component 55 with respect to the circuit substrate 24 by bringing the adhesion portion 76, which protrudes to the circuit substrate 24 more than the positioning portion 75, into contact with the side surface of the second metal pad 79.

Figure 15:
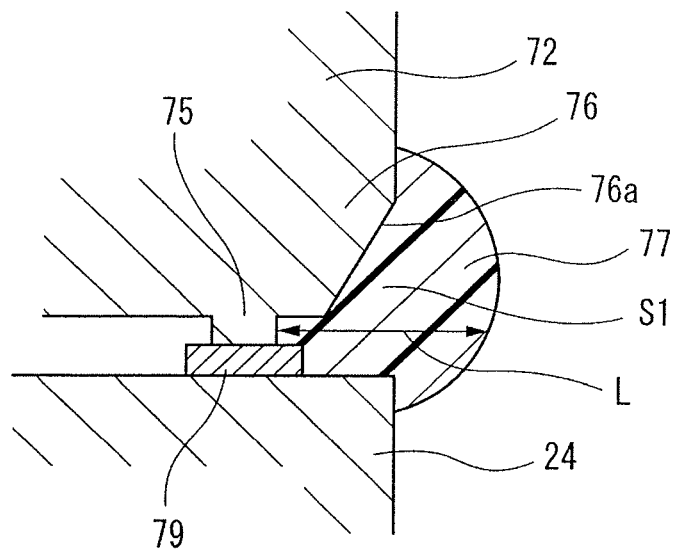
FIG. 15 is the same view as FIG. 14A according to the modified example of the present invention.
Figure 16:
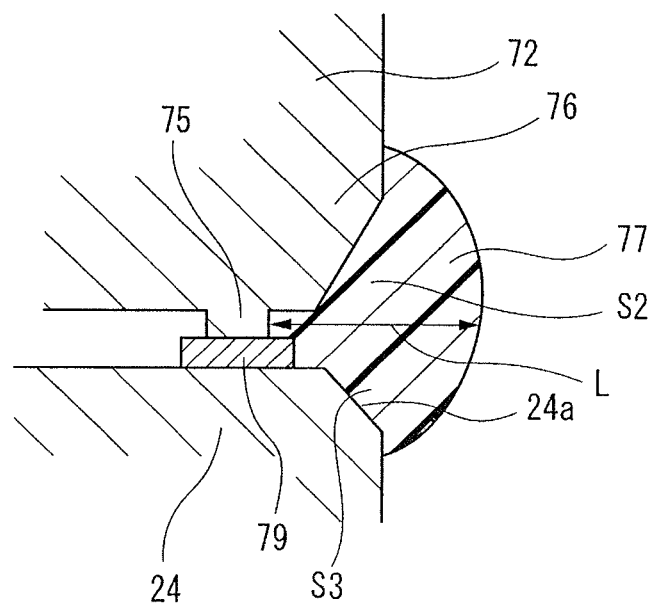
FIG. 16 is the same view as FIG. 14A according to a modified example of the example of FIG. 15.
Figure 17:
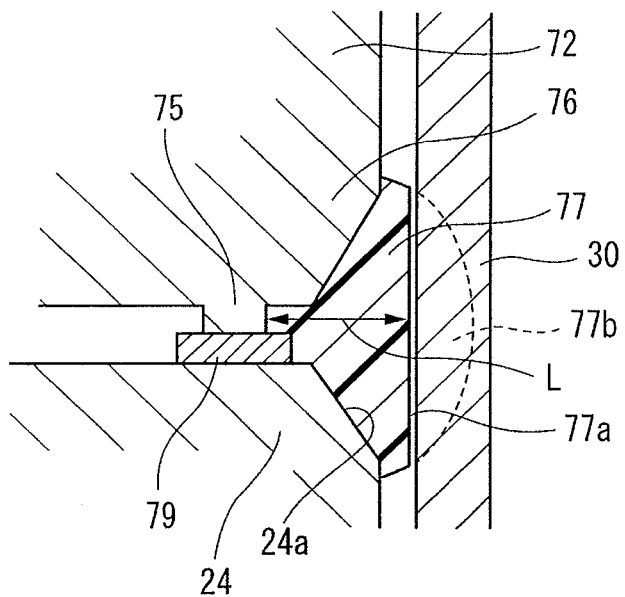
FIG. 17 is the same view as FIG. 14A according to a modified example of the example of FIG. 16.

FIGS. 15 to 17 are views showing a site of fixing the lens array component to a circuit substrate according to other modified examples. FIGS. 15 to 17 are enlarged cross-sectional views in the site of fixing the lens array component to the circuit substrate along a width direction. The left side of the drawing is a side where the element-side lens portions 65 are provided.

In the modified example shown in FIG. 15, a side surface 76a of the adhesion portion 76 is set to be a surface inclined toward the inside facing the circuit substrate 24. Accordingly, the adhesive-agent filling space S1 is formed so as to be widened toward the side of the circuit substrate 24. Accordingly, the adhesive-agent filling space S1 extends in the direction (direction of the circuit substrate 24 side) in which the positioning portion 75 protrudes. The side surface 76a of the adhesion portion 76 may not be formed in an inclined shape, but may be formed in a stepped shape.

According to the modified example shown in FIG. 15, it is easy to set the adhesive-agent filling space S1 to be large in the protruding direction of the positioning portion 75 compared to the rectangular-shaped adhesive-agent filling space S shown in FIG. 6 or 14. Accordingly, it is possible to fill the adhesive-agent filling space S1 with a large amount of adhesive agent 77. Accordingly, it is possible to accept a shear force using a large amount of the adhesive agent 77 even if a force (shear force) of the circuit substrate 24 acts on the lens array component 55 in the surface direction.

When a shear force acts on the lens array component 55, the shear force is concentrated on the vicinity of the interface between the lens array component 55 and the circuit substrate 24. In the modified example shown in FIG. 15, the adhesive-agent filling space S1 is formed so as to be widened toward (in the drawing, downward from above) the circuit substrate 24 side from the element-side lens portions 65 side. That is, the thickness of the adhesive agent 77 in the surface direction of the circuit substrate 24 is set to be larger toward the circuit substrate 24 side on which the shear force is concentrated. Accordingly, it is possible to accept the portion, on which a large shear force acts, using the thick layer of the adhesive agent 77. Accordingly, it is possible to provide an optical module 1 having high shear strength.

The adhesive-agent filling space S1 widens toward the circuit substrate 24 side in this way, and as shown by a distance L in FIG. 15, the thickness of the adhesive agent 77 along the surface direction of the circuit substrate 24 is set to be largest between a side of the adhesion portion 76, which is closest to the circuit substrate 24, and the circuit substrate 24. Accordingly, it is possible to fill a largest amount of the adhesive agent 77 into an area in which the shear force is most easily concentrated. Accordingly, the adhesive agent 77 can reliably accept the shear force even if a large shear force acts thereon.

In addition, the adhesive agent 77 is applied on the side surface of the circuit substrate 24 so as to protrude such that the adhesive agent 77 extends over the side surface of the circuit substrate 24 from the adhesive-agent filling space S1. Accordingly, when a shear force acts on the adhesive agent 77, the adhesive agent 77 is accepted by the side surface of the circuit substrate 24 and there is no case where the adhesive agent 77 is deviated with respect to the circuit substrate 24. Accordingly, it is possible to further increase the shear strength of the optical module 1.

In addition, it is preferable that the coating amount of the adhesive agent 77 be set to be slightly larger than the volume of the adhesive-agent filling space S1. When the adhesive agent 77 cannot completely fill the adhesive-agent filling space S1, desired shear strength cannot be secured. For this reason, in the modified example shown in FIG. 15, the adhesive agent 77 is cured in a state of slightly protruding toward the side from the adhesive-agent filling space S1.

The modified example shown in FIG. 16 is an example where, in the example shown in FIG. 15, an inclined surface 24a which forms a recess S3 is provided on the circuit substrate 24. In the modified example, the recess S3 is provided in a region opposing to the adhesion portion 76 of the circuit substrate 24. The adhesive agent 77 is filled into an adhesive-agent filling space S2 and the recess S3. Accordingly, it is possible to secure a large contact area between the adhesive agent 77 and the circuit substrate 24 and to increase the shear strength of the optical module 1.

In addition, the recess S3 is formed by providing the inclined surface 24a by cutting an end portion of a mounting surface of the lens array component 55 of the circuit substrate 24 into a tapered shape. Accordingly, the adhesive agent 77 may be filled thickly in the vicinity of the interface between the lens array component 55 and the circuit substrate 24 on which the shear force is easily concentrated. In this manner, the shear strength of the optical module 1 is further increased. The shape of the end portion thereof is not limited to the tapered shape, and the end portion of the mounting surface of the circuit substrate 24 may be cut into a stepped shape.

The modified example shown in FIG. 17 is an example where, in the example shown in FIG. 16, a portion of the adhesive agent 77 is removed and a side surface of an accommodation member 30 is provided along the removed surface. In the present modified example shown in FIG. 17, a portion 77b of the adhesive agent 77 protruding toward the side is removed in a direction along the side surface of the circuit substrate 24. Accordingly, a removed surface 77a is formed along the side surface of the circuit substrate 24 on the side of the adhesive agent 77. In addition, the side surface of the accommodation member 30 is disposed so as to approach the removed surface 77a.

In the present modified example, it is possible to reduce the width direction dimension of a subassembly formed of the lens array component 55 and the circuit substrate 24 by removing the portion 77b of the adhesive agent 77 protruding toward the side. Furthermore, it is possible to dispose the side surface of the accommodation member 30 at a position near to the removed surface 77a by forming the removed surface 77a along the side surface of the circuit substrate 24. Accordingly, it is possible to form an optical module 1 having high shear strength in a compact size.

The surface of the adhesion portion 76 or the circuit substrate 24 which contacts with the adhesive agent 77 may be roughened and the adhesion strength of the adhesive agent 77 may be enhanced. In addition, a groove or a recess for actively releasing the adhesive agent 77 toward the side may be provided on the side surface of the lens array component 55 so that the adhesive agent 77 is prevented from entering the element-side lens portions 65 side.

Furthermore, separately from the above-described adhesion portion 76, for example, a recess may be provided on a lower surface of the leg 72 and an adhesive agent may be filled into the recess. In addition to the adhesive-agent filling spaces S, S1, and S2, it is possible to further enhance the adhesion strength with respect to the circuit substrate 24 of the lens array component 55 by further providing an additional recess filled with the adhesive agent.

In the above-described embodiment, an example in which the focal position 62As of the fiber-side lens portions for transmission 62A is offset in the optical axis direction has been described, but the present invention is not limited thereto. For example, the end surfaces of the transmission-side optical fibers 7a may be disposed at the focal position 62As of the fiber-side lens portions for transmission 62A and the focal position 65As of the element-side lens portions for transmission 65A may be configured so as to be offset from the light emitting surfaces of the light emitting elements 52a in the optical axis direction.

In addition, in the above-described embodiment, an example in which the fiber-side lens portions for transmission 62A protrude from the lens array component 55 has been described, but the fiber-side lens portions for transmission 62A may be configured so as to be recessed on the lens array component 55. Alternatively, the position of the end surfaces of the optical fibers 7 may be adjusted and deviated from the focal positions of the lens portions 62 and 65 in the optical axis direction. Alternatively, steps may be provided on the circuit substrate 24, the light emitting surfaces of the light emitting elements 52a and the light emitting surfaces of the light receiving elements 52b may be offset to each other, and the light emitting elements 52a may be disposed at a position deviated from the focal position 65As of the element-side lens portions for transmission 65A in the optical axis direction.

Furthermore, in the above-described optical module, a case where the tip ends of the transmission-side optical fibers are positioned at a position which is offset from the focal position of the first lens portion in the optical axis direction has been described as a configuration in which the reflection return light intensity decreases by 10 dB or greater compared to the case where the optical coupling efficiency of the light emitting elements and the transmission-side optical fibers is maximum, and in which the decrease of the optical coupling efficiency with respect to the case where the optical coupling efficiency of the light emitting elements and the transmission-side optical fibers is maximum is 1 dB or less. However, other modes can also be applied to the present invention.

That is, the tip ends of the transmission-side optical fibers may not be disposed at the position which is offset from the focal position of the first lens portion in the optical axis direction (that is, in a state of being disposed at the focal position) and the end surfaces of the transmission-side optical fibers or the surface of the first lens portion may be subjected to anti-reflection treatment (anti-reflective coating).

The present application is based on Japanese Patent Application (No. 2012-033861), filed Feb. 20, 2012 and on Japanese Patent Application (No. 2012-233538), filed Oct. 23, 2012, the whole disclosures of which are incorporated herein by reference.

INDUSTRIAL APPLICABILITY

According to the present invention, a lens component which can obtain high optical coupling efficiency and an optical module which can obtain the high optical coupling efficiency are provided.

REFERENCE SIGNS LIST

1: Optical module, 7: Optical fiber (optical fiber, optical element), 24: Circuit substrate (substrate), 52: Light emitting and receiving element (optical element), 52a: Light emitting element, 52b: Light receiving element, 62A: Fiber-side lens portion for transmission (lens portion), 62As, 62Bs, 65As, and 65Bs: Focal position, 62B: Fiber-side lens portion for reception (lens portion), 65A: Element-side lens portion for transmission (lens portion), 65B: Element-side lens portion for reception (lens portion) 55: Lens array component (lens component), 75: Positioning portion, 76: Adhesion portion, 77: Adhesive agent, 78: First metal pad, 79: Second metal pad, 80: Electrical wiring, S: Adhesive-agent filling space

The invention claimed is:
1. An optical module comprising:
an optical fiber;
an optical element;
a substrate on which the optical element is mounted; and
a lens component that optically connects the optical fiber and the optical element,
wherein the lens component includes
a lens portion that faces the optical element;
a reflecting surface optically connected to the lens portion and the optical fiber;
a positioning portion that protrudes more than the lens portion such that the lens portion is separated from the substrate by a predetermined distance, and contacts with the substrate; and
an adhesion portion which is provided adjacent to the positioning portion and forms an adhesive-agent filling space between the substrate and the adhesion portion, and
wherein the lens component is fixed to the substrate using an adhesive agent introduced to the adhesive-agent filling space in a state where the positioning portion contacts with the substrate,
wherein a first metal pad and a second metal pad, which are formed to have an equal thickness, are provided on the substrate, the optical element is mounted on the first metal pad, and the positioning portion contacts with the second metal pad.

2. The optical module according to claim 1,
wherein an electrical wiring, which is connected to a control circuit that controls the optical element, extends in one direction from the optical element, and further comprising an additional second metal pad provided such that both second metal pads are provided at positions facing each other with the electrical wiring interposed therebetween.

3. The optical module according to claim 1,
wherein the second metal pad is provided so as to surround the first metal pad.

4. The optical module according to claim 1,
wherein the positioning portion protrudes more than the adhesion portion.

5. An optical module comprising:
an optical fiber;
an optical element;
a substrate on which the optical element is mounted; and
a lens component that optically connects the optical fiber and the optical element,
wherein the lens component includes
a lens portion that faces the optical element;
a reflecting surface optically connected to the lens portion and the optical fiber;
a positioning portion that protrudes more than the lens portion such that the lens portion is separated from the substrate by a predetermined distance, and contacts with the substrate; and
an adhesion portion which is provided adjacent to the positioning portion and forms an adhesive-agent filling space between the substrate and the adhesion portion, and
wherein the lens component is fixed to the substrate using an adhesive agent introduced to the adhesive-agent filling space in a state where the positioning portion contacts with the substrate,
wherein, the lens portion includes
a first lens portion facing the optical fiber which is a transmission-side optical fiber,
a second lens portion facing the optical element which is a light emitting element, and
the first lens portion and the second lens portion are optically connected by the reflecting surface,
wherein the optical module further comprises
a transmission-side optical system including the transmission-side optical fiber, the light emitting element, the first lens portion, and the second lens portion,
wherein the following inequations (1) to (3) are established when the following variables are set such that the numerical aperture of the light emitting element is NA1, the numerical aperture of the transmission-side optical fiber is NA2, the magnification of the transmission-side optical system is M, the diameter of light emitting surface of the light emitting element is $\Phi1$, the maximum error of the mounting position of the light emitting element is d1, the core diameter of the optical fiber is $\Phi2$, and the maximum error of the mounting position of the optical fiber is d2, and
wherein a tip end of the optical fiber is positioned at a position which is offset from a focal position of the lens portion in an optical axis direction such that the reflection return light intensity decreases by 10 dB or greater compared to a case where the optical coupling efficiency of the light emitting element and the optical fiber is maximum, and that decrease of the optical coupling efficiency with respect to the case where the optical coupling efficiency of the light emitting element and the optical fiber is maximum decreases is 1 dB or less $$M\Phi1 < \Phi2 \tag{1}$$

$$M(d1+\Phi1/2) < \Phi2/2 - d2 \tag{2}$$

$$NA1/M < NA2 \tag{3}.$$

6. The optical module according to claim 5,
wherein the lens portion includes
a third lens portion facing the optical fiber which is a reception-side optical fiber, and
a fourth lens portion facing the optical element which is a light receiving element,
wherein the optical module further comprises
a reception-side optical system including the reception-side optical fiber, the light receiving element, the third lens portion, and the fourth lens portion, and
wherein decrease of the total optical coupling efficiency in the transmission-side optical system and the reception-side optical system with respect to the maximum efficiency decreases is 3 dB to 6 dB.

7. The optical module according to claim 6,
wherein the third lens portion is disposed such that the reception-side optical fiber is positioned at a focal position thereof, the fourth lens portion is disposed such that the light receiving element is positioned at a focal position thereof, and at least one of the third lens portion and the fourth lens portion is an aspherical lens.

8. The optical module according to claim 1,
wherein the adhesive-agent filling space extends along a protruding direction of the positioning portion.

9. The optical module according to claim 1,
wherein the adhesive-agent filling space is formed so as to be recessed from a side surface of the lens component and is formed so as to spread from the lens portion to the substrate.

10. The optical module according to claim 1,
wherein a recess is provided in a region facing an adhesive portion of the substrate, and the adhesive agent is filled in the adhesive-agent filling space and the recess.

11. The optical module according to claim 1,
wherein the adhesive agent is filled such that the thickness of the adhesive agent along a surface direction of the substrate becomes largest between a side of the adhesion portion closest to the substrate and the substrate.

12. The optical module according to claim 1,
wherein the adhesive agent is applied by extending over a side surface of the substrate from the adhesive-agent filling space.

13. The optical module according to claim 1, further comprising:
an accommodation member that accommodates the lens component and the substrate,
wherein a portion of the adhesive agent is removed in a direction along the side surface of the substrate and a side surface of the accommodation member is provided along the removed surface of the adhesive agent.

* * * * *